(12) United States Patent
    Takashima

(10) Patent No.: US 11,910,107 B2
(45) Date of Patent: Feb. 20, 2024

(54) IMAGE PROCESSING APPARATUS AND IMAGE PICKUP APPARATUS

(71) Applicant: SONY GROUP CORPORATION, Tokyo (JP)

(72) Inventor: Masatoshi Takashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/626,850

(22) PCT Filed: Jun. 1, 2020

(86) PCT No.: PCT/JP2020/021657
§ 371 (c)(1),
(2) Date: Jan. 13, 2022

(87) PCT Pub. No.: WO2021/014764
PCT Pub. Date: Jan. 28, 2021

(65) Prior Publication Data
US 2022/0264060 A1    Aug. 18, 2022

(30) Foreign Application Priority Data

Jul. 24, 2019  (JP) .................. 2019-136217

(51) Int. Cl.
*H04N 25/13*    (2023.01)
*H04N 23/84*    (2023.01)
*H04N 25/131*   (2023.01)

(52) U.S. Cl.
CPC ......... *H04N 25/135* (2023.01); *H04N 23/843* (2023.01); *H04N 25/131* (2023.01)

(58) Field of Classification Search
CPC ....... G01J 2003/1213; G01J 2003/2806; G01J 2003/2826; G01J 2003/516; G01J 3/0208;
(Continued)

(56) References Cited

U.S. PATENT DOCUMENTS 7,375,803 B1    5/2008  Bamji
7,456,878 B1   11/2008  Sun
(Continued)

FOREIGN PATENT DOCUMENTS

CN      1937718 A     3/2007
CN    101309428 A    11/2008
(Continued)

OTHER PUBLICATIONS

International Search Report and Written Opinion of PCT Application No. PCT/JP2020/021657, dated Jul. 28, 2020, 16 pages of ISRWO.

(Continued)

*Primary Examiner* — Antoinette T Spinks
(74) *Attorney, Agent, or Firm* — CHIP LAW GROUP

(57) ABSTRACT

Provided is an image pickup apparatus including a multi-band pass filter that selectively transmits band light in a specific band, a color filter that transmits the band light in the specific band per pixel of an image pickup device, the image pickup device that receives light transmitted by the multi-band pass filter and the color filter, and a signal processing section to which a pixel value of the image pickup device is input and which executes a signal process on the pixel value. The multi-band pass filter is configured to selectively transmit band light corresponding to a plurality of color filter elements, and the signal processing section generates a pixel value corresponding to a band, of a pixel to be processed using a raw image base pixel value signal per pixel and a spectral characteristic parameter of the image pickup apparatus.

17 Claims, 26 Drawing Sheets

(58) Field of Classification Search
CPC ........ G01J 3/0262; G01J 3/2803; G01J 3/513; H04N 5/332; H04N 9/04515; H04N 9/0455; H04N 9/04553; H04N 9/04559; H04N 9/67; H04N 23/11; H04N 23/843; H04N 25/11; H04N 25/131; H04N 25/135
See application file for complete search history.

(56) References Cited

U.S. PATENT DOCUMENTS

| | | | |
|---|---|---|---|
| 7,817,335 B2* | 10/2010 | Ryu | G02B 21/06 359/385 |
| 2004/0008969 A1 | 1/2004 | Wilsher | |
| 2007/0268375 A1 | 11/2007 | Robinson | |
| 2011/0310014 A1 | 12/2011 | Mizuno | |
| 2017/0040367 A1 | 2/2017 | Wang | |
| 2017/0176336 A1* | 6/2017 | Dimitriadis | G01N 21/6428 |
| 2018/0307906 A1 | 10/2018 | Nelson | |
| 2023/0075997 A1* | 3/2023 | Valdes | A61B 1/0669 |

FOREIGN PATENT DOCUMENTS

| | | | |
|---|---|---|---|
| CN | 105136732 A | | 12/2015 |
| CN | 106241725 A | | 12/2016 |
| CN | 106404684 A | | 2/2017 |
| JP | 2014027597 A | * | 2/2014 |
| JP | 2016197794 A | | 11/2016 |
| JP | 2017009395 A | | 1/2017 |
| JP | 2017032537 A | | 2/2017 |
| JP | 2017118284 A | | 6/2017 |
| JP | 6321693 B2 | | 5/2018 |
| JP | 2018098341 A | | 6/2018 |
| TW | 201706578 A | | 2/2017 |

OTHER PUBLICATIONS

Tang, et al., "High Resolution Photography with an RGB-Infrared Camera", IEEE, International Conference on Computational Photography (ICCP), XP033183076, Apr. 24-26, 2015, 10 pages.

Skorka, et al., "Color correction for RGB sensors with dual-band filters for in-cabin imaging applications", Electronic Imaging, Autonomous Vehicles and Machines Conference, XP055715959, Jan. 13, 2019, 08 pages.

Ramanath, et al., "Color image processing pipeline: a general survey of digital still camera processing", IEEE, Signal Processing Magazine, XP011128683, vol. 22, No. 1, Jan. 1, 2005, 10 pages.

* cited by examiner

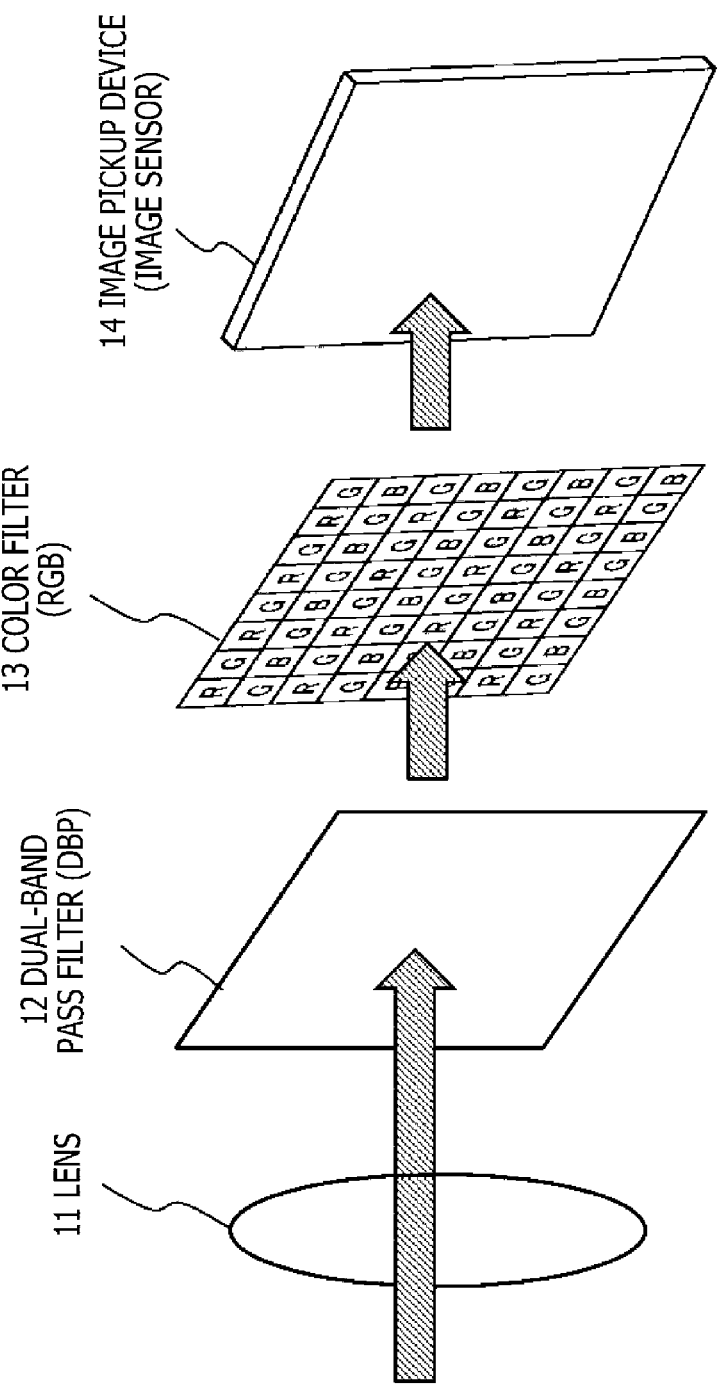
F I G . 1

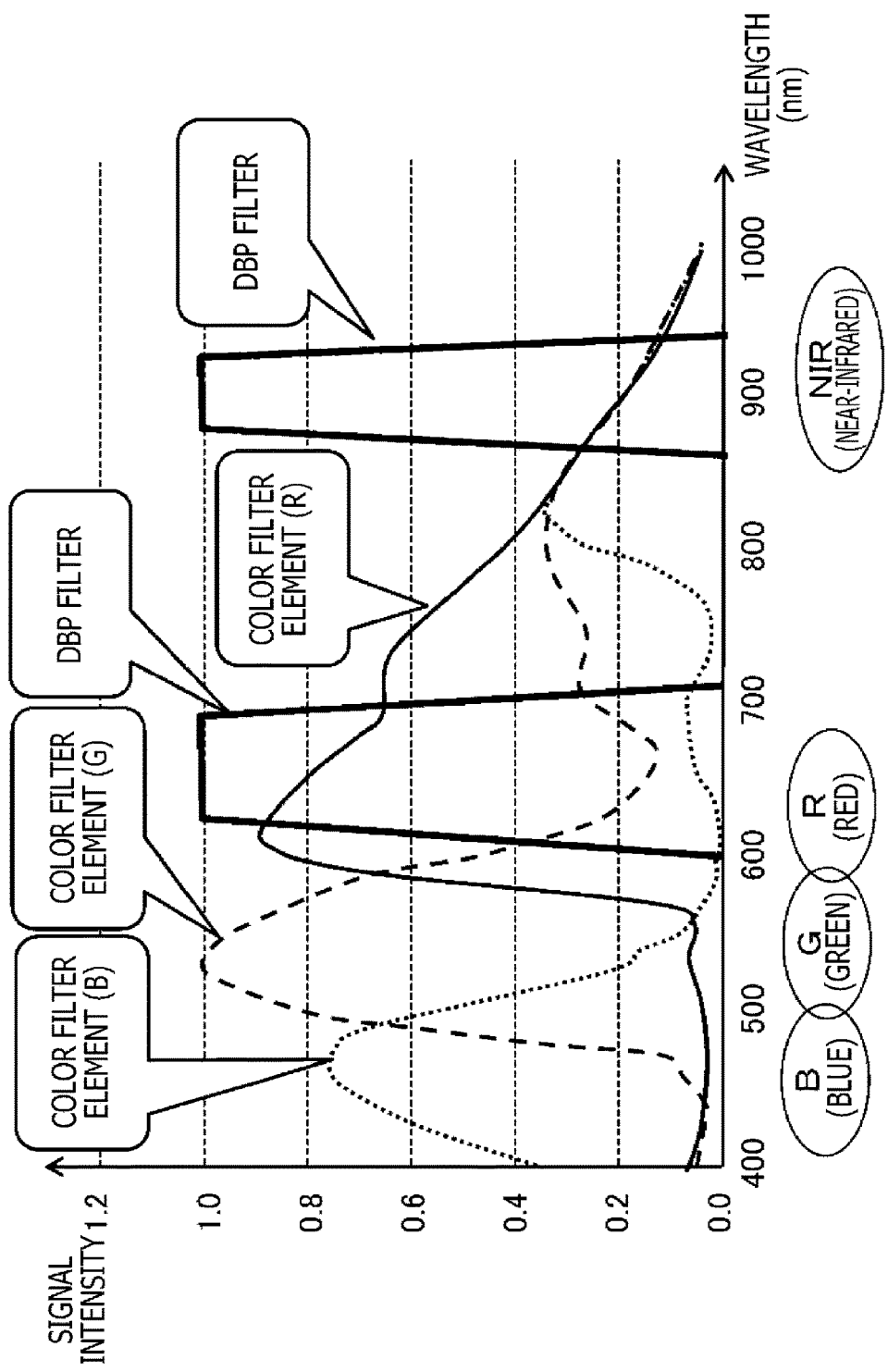
F I G . 2

FIG. 4

| COLOR FILTER (RGBIR FILTER) | | | | | | | |
|---|---|---|---|---|---|---|---|
| IR | B | IR | B | IR | B | IR | B |
| R | G | R | G | R | G | R | G |
| IR | B | IR | B | IR | B | IR | B |
| R | G | R | G | R | G | R | G |
| IR | B | IR | B | IR | B | IR | B |
| R | G | R | G | R | G | R | G |
| IR | B | IR | B | IR | B | IR | B |
| R | G | R | G | R | G | R | G |

FIG. 8

|   |   |   |   |   |   |   |   |
|---|---|---|---|---|---|---|---|
| A | B | A | B | A | B | A | B |
| D | C | D | C | D | C | D | C |
| A | B | A | B | A | B | A | B |
| D | C | D | C | D | C | D | C |
| A | B | A | B | A | B | A | B |
| D | C | D | C | D | C | D | C |
| A | B | A | B | A | B | A | B |
| D | C | D | C | D | C | D | C |

COLOR FILTER (ABCD FILTER)

FIG. 22
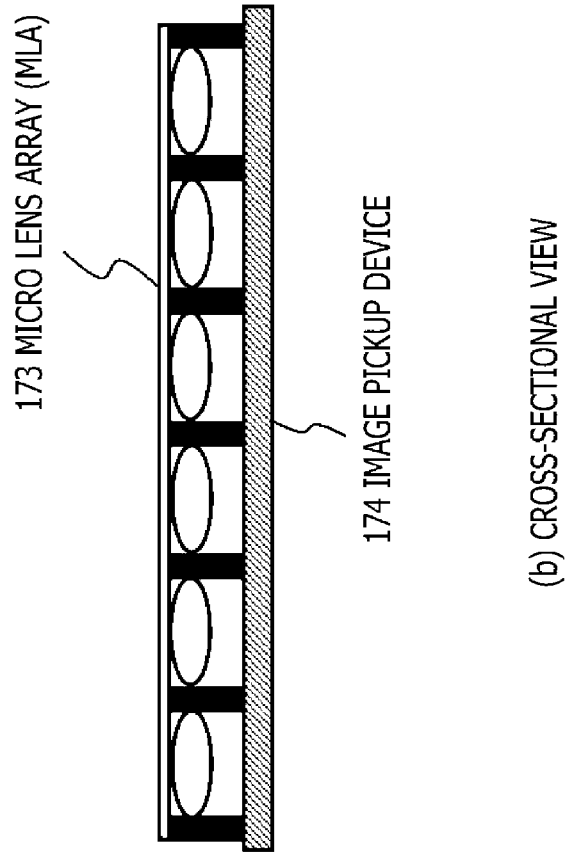
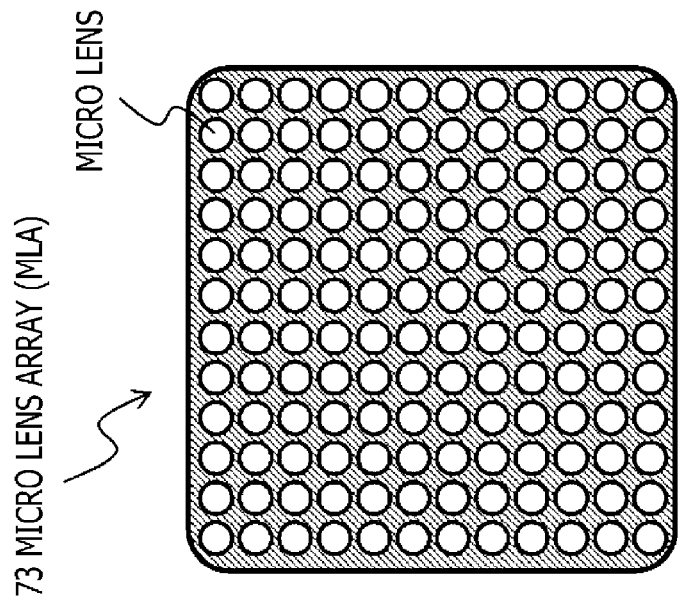

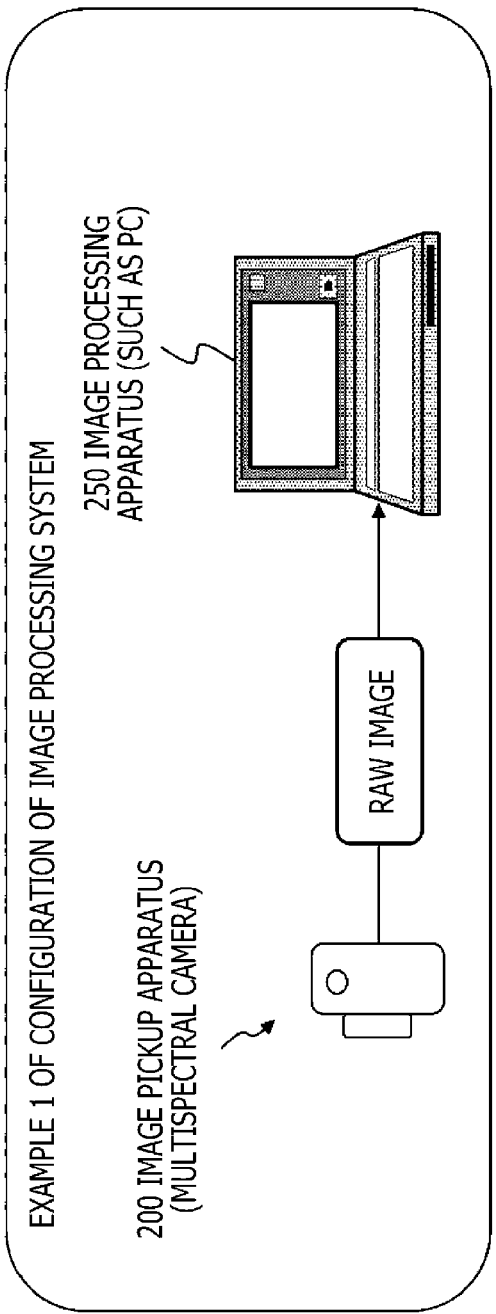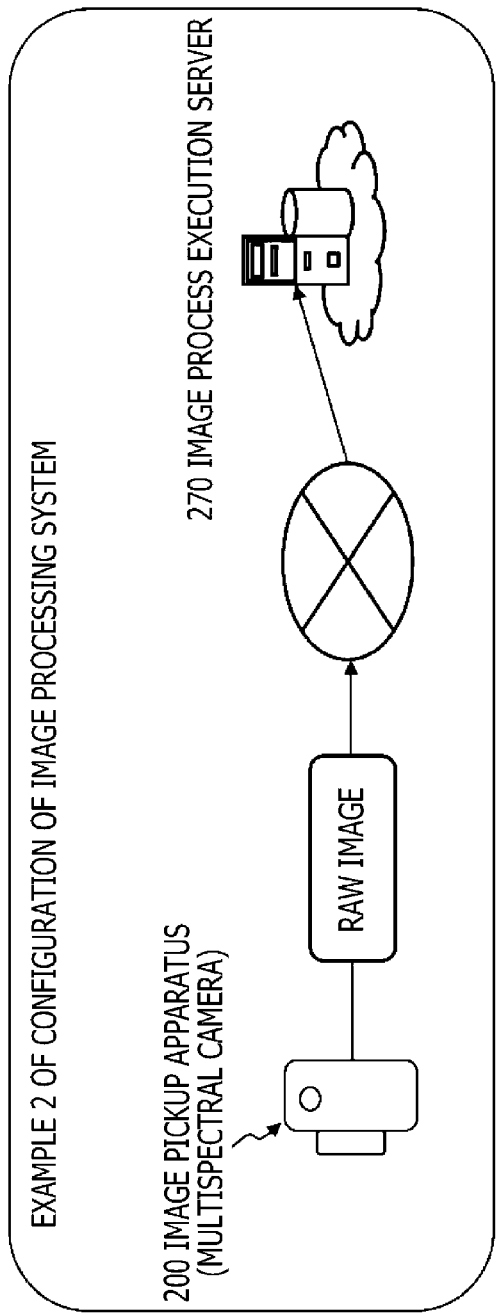
FIG. 25A
FIG. 25B

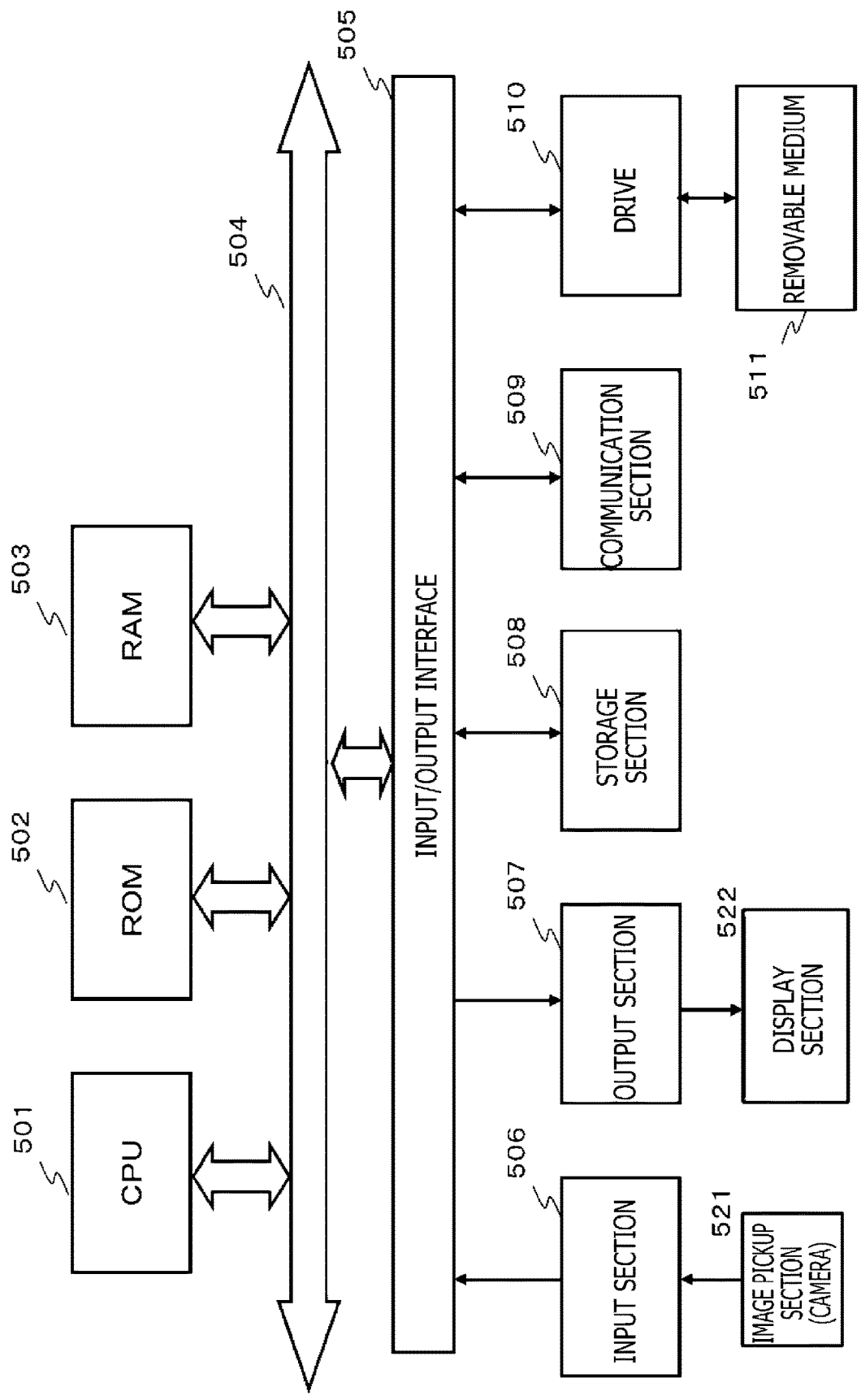

IMAGE PROCESSING APPARATUS AND IMAGE PICKUP APPARATUS

CROSS REFERENCE TO RELATED APPLICATIONS

This application is a U.S. National Phase of International Patent Application No. PCT/JP2020/021657 filed on Jun. 1, 2020, which claims priority benefit of Japanese Patent Application No. JP 2019-136217 filed in the Japan Patent Office on Jul. 24, 2019. Each of the above-referenced applications is hereby incorporated herein by reference in its entirety.

TECHNICAL FIELD

The present disclosure relates to an image processing apparatus, an image pickup apparatus, an image processing method, and a program. Specifically, the present disclosure relates to an image processing apparatus, an image pickup apparatus, and a program capable of enhancing separation performance for separating light in narrow bands such as RGB bands, and highly precisely separating and analyzing component signals in wavelength bands such as RGB signals contained in a light received signal.

BACKGROUND ART

In an ordinary image pickup apparatus (camera), light via an RGB color filter is input to an image pickup device (image sensor). Each pixel on the image pickup device outputs a pixel value in response to an intensity of input light corresponding to each wavelength light (R, G, or B) in the filter, to a signal processing section. The signal processing section generates a color image using pixel values output from the image pickup device, that is, RGB pixel value signals.

The image pickup device is configured with many pixels, and a pixel that receives light passing through each R (red) region in the RGB color filter is referred to as "R pixel," a pixel that receives light passing through each G (green) region in the RGB color filter is referred to as "G pixel," and a pixel that receives light passing through each B (blue) region in the RGB color filter is referred to as "B pixel."

However, the light passing through each of the color (RGB) regions in the RGB color filter also contains undesired wavelength (color) signals that are not supposed to be contained.

For example, while the light passing through each R (red) region in the RGB color filter is mostly wavelength light of an R (red) component, the pass-through light slightly contains wavelength light such as green (G) and blue (B) light other than R (red) light, and yet infrared light (IR).

The same thing is true for the light passing through each of the G (green) and B (blue) regions other than the R (red) region in the RGB color filter. While the light passing through each G (green) filter element is mostly wavelength light of a G (green) component, the pass-through light contains other wavelength light. While the light passing through each B (blue) filter element is mostly wavelength light of a B (blue) component, the pass-through light contains other wavelength light.

A pixel value of each of the RGB pixels on the image pickup device to which the light is input via the RGB color filter results in not a pixel value containing only a signal of each of the RGB colors but a pixel value containing noise components that are other color components.

A color image generated on the basis of the pixel values containing such noise components contains noise components, which degrade an image quality of the color image.

Furthermore, there is recently known a technology for measuring an activity of vegetation by capturing images of agricultural crops and various types of vegetation such as flowers and trees using a camera provided in, for example, a drone and analyzing the captured images.

Examples of a vegetation index that indicates an activity of vegetation include an NDVI (Normalized Difference Vegetation Index).

Calculating an NDVI of the vegetation within the image captured by the camera by analysis of the captured image makes it possible to estimate the activity of the vegetation within the captured image.

To perform this NDVI calculation process, it is necessary to highly precisely analyze color components contained in the vegetation that is a subject.

However, if each pixel value of RGB pixels in the images captured by the image pickup device contains the noise components described above, then it may be impossible to highly precisely calculate the NDVI and to accurately estimate the activity of the vegetation within the captured images.

It is noted that examples of a camera for high precision analysis of color components of a subject include a multispectral camera.

A multispectral camera is a camera using, together with a color filter, a band-pass filter (BP filter) that allows only specific wavelength light to pass therethrough.

Inputting the light allowed to pass through the band-pass filter (BP filter) and the color filter to the image pickup device makes it possible to selectively input a specific wavelength light component passing through the band-pass filter (BP filter) to each pixel of the image pickup device.

Note that examples of a conventional technology related to the multispectral camera include PTL 1 (U.S. Pat. No. 7,375,803).

The technology disclosed in PTL 1 is disclosure of a configuration of extracting and using an IR component value at a time of detecting a distance to a subject by means of an image pickup device having RGB and IR (infrared) pixels.

PTL 1, however, fails to disclose a color image quality enhancement process and high precision analysis process for each color component.

CITATION LIST

Patent Literature

[PTL 1]
U.S. Pat. No. 7,375,803

SUMMARY

Technical Problem

It is desirable to provide an image processing apparatus, an image pickup apparatus, an image processing method, and a program capable of performing an image quality enhancement process on an image captured using, together with a color filter, a band-pass filter (BP filter) that allows a specific band signal such as specific wavelength light to pass therethrough, and high precision analysis on color components of a subject.

Solution to Problem

According to an embodiment of the present disclosure, there is provided an image pickup apparatus including:

a multi-band pass filter that selectively transmits band light in a specific band;

a color filter that transmits the band light in the specific band per pixel of an image pickup device;

the image pickup device that receives light transmitted by the multi-band pass filter and the color filter; and a signal processing section to which a pixel value of the image pickup device is input and which executes a signal process on the pixel value, the multi-band pass filter being configured to selectively transmit band light corresponding to a plurality of color filter elements that constitutes the color filter, and the signal processing section generating a pixel value corresponding to a band, of a pixel to be processed, using a raw image base pixel value signal per pixel based on the pixel value of the image pickup device and a spectral characteristic parameter of the image pickup apparatus.

Furthermore, according to another embodiment of the present disclosure, there is provided an image processing apparatus including a signal processing section to which a pixel value of an image pickup device of a multispectral camera is input and which executes a signal process on the pixel value, the signal processing section generating a pixel value corresponding to a band, of a pixel to be processed, using a raw image base pixel value signal per pixel based on the pixel value of the image pickup device and a spectral characteristic parameter of the image pickup apparatus.

Moreover, according to a yet another embodiment of the present disclosure, there is provided an image processing method executed by an image pickup apparatus, the image pickup apparatus including:

a multi-band pass filter that selectively transmits band light in a specific band;

a color filter that transmits the band light in the specific band per pixel of an image pickup device;

the image pickup device that receives light transmitted by the multi-band pass filter and the color filter; and a signal processing section to which a pixel value of the image pickup device is input and which executes a signal process on the pixel value, the multi-band pass filter being configured to selectively transmit band light corresponding to a plurality of color filter elements that configures the color filter, and the signal processing section generating a pixel value corresponding to a band, of a pixel to be processed, using a raw image base pixel value signal per pixel based on the pixel value of the image pickup device and a spectral characteristic parameter of the image pickup apparatus.

Furthermore, according to a still another embodiment of the present disclosure, there is provided an image processing method executed by an image processing apparatus, the image processing apparatus including a signal processing section to which a pixel value of an image pickup device of a multispectral camera is input and which executes a signal process on the pixel value, the signal processing section generating a pixel value corresponding to a band, of a pixel to be processed, using a raw image base pixel value signal per pixel based on the pixel value of the image pickup device and a spectral characteristic parameter of the image pickup apparatus.

Moreover, according to a further embodiment of the present disclosure, there is provided a program for causing an image process to be executed in an image processing apparatus, the image processing apparatus including:

a signal processing section to which a pixel value of an image pickup device of a multispectral camera is input and which executes a signal process on the pixel value, the program causing the signal processing section to generate a pixel value corresponding to a band, of a pixel to be processed, using a raw image base pixel value signal per pixel based on the pixel value of the image pickup device and a spectral characteristic parameter of the image pickup apparatus.

It is noted that the program of an embodiment of the present disclosure is a program that can be provided by, for example, a storage medium or a communication medium that provides the program in a computer readable fashion to an information processing apparatus or a computer system capable of executing various program codes. Providing such a program in a computer readable fashion makes it possible to realize a process in response to the program on the information processing apparatus or the computer system.

Still other objects, features, and advantages of the present disclosure will readily be apparent from more detailed description based on embodiments of the present disclosure to be described later and accompanying drawings. It is noted that a system in the present specification means a logical assembly configuration of a plurality of apparatuses and is not limited to a system in which apparatuses with configurations are provided in the same casing.

According to a configuration of one embodiment of the present disclosure, the apparatuses and the method capable of calculating true pixel values in a noise-component-reduced specific band are realized.

Specifically, the configuration has, for example, a multi-band pass filter that selectively transmits band light in a specific band, a color filter, an image pickup device that receives light transmitted by each filter, and a signal processing section. The multi-band pass filter is configured to selectively transmit band light corresponding to color filter elements in the color filter, and the signal processing section executes iterative calculation of an equation of calculating a pixel value corresponding to a band using a raw image base pixel value signal per pixel generated on the basis of a pixel value of the image pickup device and a spectral characteristic parameter of an image pickup apparatus, and calculates a convergence value obtained by the iterative calculation, as the pixel value corresponding to the band, of a pixel to be processed.

With these configurations, the apparatuses and the method capable of calculating true pixel values in the noise-component-reduced specific band are realized.

Note that the advantages described in the present specification are given as an example only, and the advantages are not limited to those described in the present specification and may contain additional advantages.

BRIEF DESCRIPTION OF DRAWINGS

FIG. 1 is an explanatory diagram of an example of a configuration of a multispectral camera.

FIG. 2 is an explanatory diagram of an example of spectral characteristics of a filter in the multispectral camera.

FIG. 4 is an explanatory diagram of an example of a configuration of an RGBIR color filter.

FIG. 8 is an explanatory diagram of an example of a configuration of an ABCD color filter that transmits four different types of wavelength signals A to D.

FIG. 22 is an explanatory diagram of the Micro Lens Array (MLA).

FIGS. 25A and 25B illustrate explanatory diagrams of examples of configurations of the image processing apparatus and an image processing system according to an embodiment of the present disclosure. band.

DESCRIPTION OF EMBODIMENTS

Figure 3A:
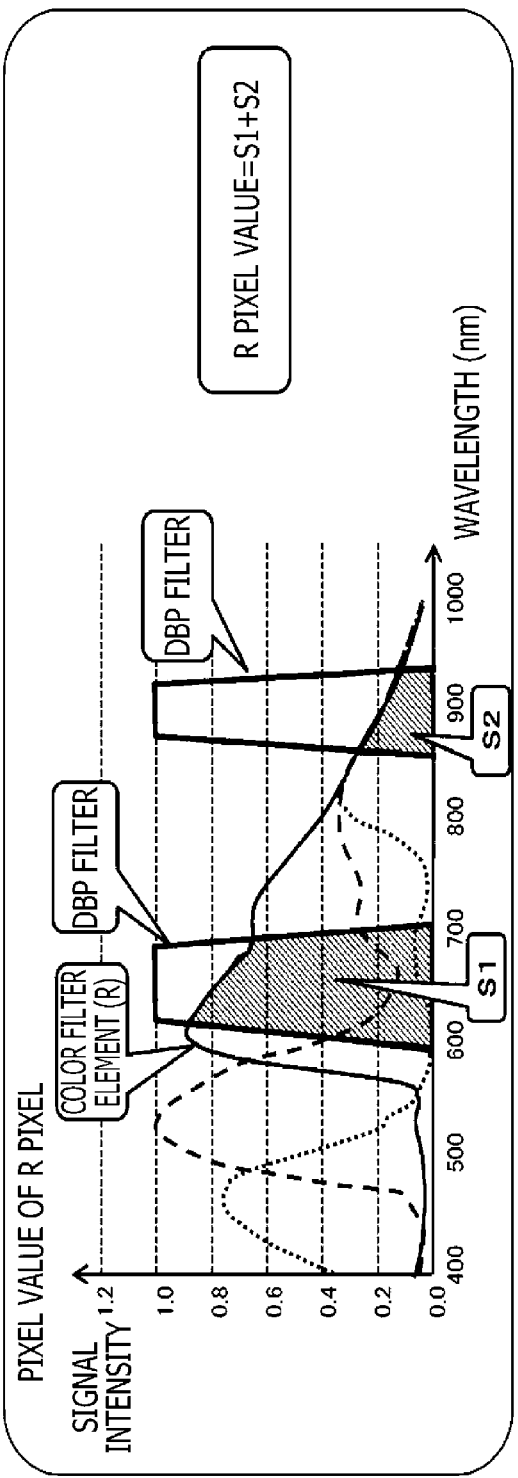
FIGS. 3A and 3B illustrate explanatory diagrams of pixel values of the multispectral camera.

An image processing apparatus, an image pickup apparatus, an image processing method, and a program according to an embodiment of the present disclosure will hereinafter be described with reference to the drawings. Note that description will be given in the following order.

1. Outline of multispectral camera
2. Configurations and processes of image pickup apparatus and image processing apparatus according to embodiment of present disclosure
3. Sequence of processes executed by image processing apparatus according to embodiment of present disclosure
4. Difference between processes according to embodiment of present disclosure and matrix applied processes
5. Specific example of using image processing apparatus according to embodiment of present disclosure
6. Other embodiments
6-(1) Example of configuration of apparatus using micro lens array as an alternative to color filter
6-(2) Example of configuration of apparatus using plasmonic filter as an alternative to color filter
7. Example of configurations of image pickup apparatus, image processing apparatus, and image processing system according to embodiment of present disclosure
8. Example of hardware configuration of image processing apparatus
9. Summary of configurations according to embodiment of present disclosure 1. Outline of Multispectral Camera An outline of a multispectral camera will first be described.

As described above, a multispectral camera is a camera using, together with a color filter, a band-pass filter (BP filter) that allows only specific wavelength light to pass therethrough.

Inputting the light passing through the band-pass filter (BP filter) and the color filters to the image pickup device makes it possible to highly precisely input a specific wavelength light component passing through the band-pass filter (BP filter) to each pixel of an image pickup device.

FIG. 1 depicts an example of a configuration of a multispectral camera 10.

The multispectral camera 10 depicted in FIG. 1 is used, for example, to analyze an activity of vegetation. Specifically, the multispectral camera 10 is a camera that captures an image, for example, to analyze an R (red) component and an NIR (near-infrared) component contained in the captured image.

As described above, examples of the vegetation activity index include the NDVI (Normalized Difference Vegetation Index).

Calculating an NDVI of the vegetation within the image captured by the camera by analysis of the captured image makes it possible to estimate the activity of the vegetation within the captured image.

To perform this NDVI calculation process, it is necessary to highly precisely analyze color components contained in the vegetation that is a subject.

Photographic light of the subject input via a lens 11 of the multispectral camera 10 depicted in FIG. 1 is input to an image pickup device (image sensor) 14 via a dual-band pass filter (DBP) 12 and a color filter (RGB color filter) 13.

The dual-band pass filter (DBP) 12 is a filter that selectively transmits light of two different wavelength light components.

The dual-band pass filter (DBP) 12 described herein is a filter that selectively transmits two different wavelength light components, which are the R (red) component and the NIR (near-infrared) component.

The color filter (RGB color filter) 13 is a filter that transmits wavelength light of each of RGB color components per pixel. The color filter (RGB color filter) 13 is, for example, Bayer array RGB filter.

The light passing through the dual-band pass filter (DBP) 12 and an R (red) filter element, a G (green) filter element, or a B (blue) filter element in the color filter (RGB color filter) 13 is input to each pixel of the image pickup device (image sensor) 14.

The light passing through the dual-band pass filter (DBP) 12 and the R (red) filter element in the color filter (RGB color filter) 13 is input to each R pixel of the image pickup device (image sensor) 14.

The light passing through the dual-band pass filter (DBP) 12 and the G (green) filter element in the color filter (RGB color filter) 13 is input to each G pixel of the image pickup device (image sensor) 14.

The light passing through the dual-band pass filter (DBP) 12 and the B (blue) filter element in the color filter (RGB color filter) 13 is input to each B pixel of the image pickup device (image sensor) 14.

FIG. 2 is a diagram depicting graphs for explaining spectral characteristics of the dual-band pass filter (DBP) 12 and the color filter (RGB color filter) 13.

A horizontal axis indicates a wavelength (400 to 1000 nm) and a vertical axis indicates a signal intensity (relative value) of filter transmitted light.

According to the graphs, while light transmitted by each color filter element (B) configuring the color filter (RGB color filter) 13 is mostly the B (blue) component that is wavelength light near approximately 450 nm, the color filter element (B) transmits not a little light of the other wavelength components.

Furthermore, while light transmitted by color filter element (G) is mostly the G (green) component that is wavelength light near approximately 540 nm, the transmitted light contains light of the other wavelength components.

Likewise, while light transmitted by each color filter element (R) is mostly the R (red) component that is wavelength light near approximately 650 nm, the transmitted light contains light of other wavelength components.

The light transmitted by the dual-band pass filter (DBP) 12 is the two wavelength light components, which are the R (red) component that is the wavelength light near approximately 650 nm and the NIR (near-infrared) component that is the wavelength light near approximately 900 nm.

Next, with reference to FIGS. 3A and 3B, an example of calculating a pixel value of each of R and B pixels that are pixels configuring the image pickup device (image sensor) 14 in a case of capturing an image using the dual-band pass filter (DBP) 12 exhibiting spectral characteristics and the color filter (RGB color filter) 13 depicted in FIG. 2 will be described.

Figure 3B:
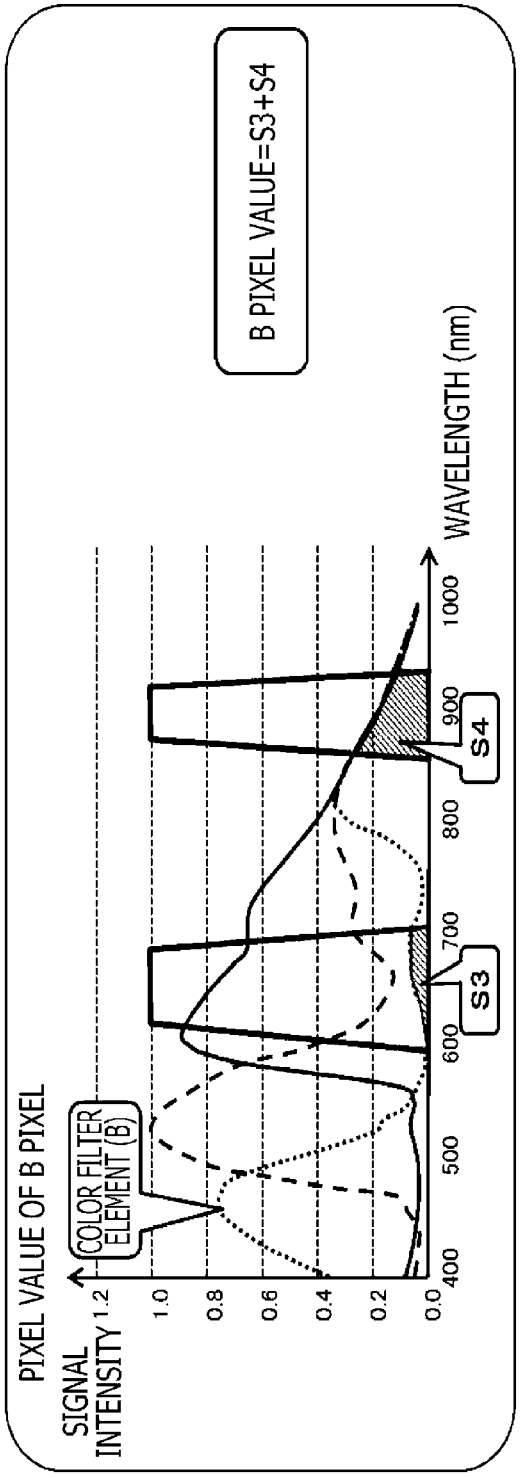

FIGS. 3A and 3B illustrate examples of calculating pixel values of the following pixels.

FIG. 3B A pixel value of the R pixel

FIG. 3A A pixel value of the B pixel

First, an example of calculating (1) a pixel value of the R pixel will be described.

The light passing through the dual-band pass filter (DBP) 12 and each R (red) filter element in the color filter (RGB color filter) 13 is input to each R pixel that is a pixel configuring the image pickup device (image sensor) 14.

As described above, while the light transmitted by the color filter element (R) is mostly the R (red) component that is the wavelength light near approximately 650 nm, the transmitted light contains light of other wavelength components.

The light transmitted by the dual-band pass filter (DBP) 12 is the two wavelength light components, which are the R (red) component that is the wavelength light near approximately 650 nm and the NIR (near-infrared) component that is the wavelength light near approximately 900 nm.

As a result, a pixel value of the R pixel that is the pixel configuring the image pickup device (image sensor) 14 is a pixel value corresponding to a signal obtained by adding up signals S1 and S2 depicted in FIG. 3A.

In other words, the following equation is established.

Pixel value of R pixel: Rraw=S1+S2

It is noted that 'raw' in Rraw means a raw image. In other words, the pixel value of the R pixel is a pixel value, which is not subjected to a signal process, on the image pickup device.

Next, an example of calculating (2) a pixel value of the B pixel will be described.

The light passing through the dual-band pass filter (DBP) 12 and each B (blue) filter element in the color filter (RGB color filter) 13 is input to each B pixel that is the pixel configuring the image pickup device (image sensor) 14.

While the light transmitted by the color filter element (B) is mostly the B (blue) component that is wavelength light near approximately 450 nm, the transmitted light contains light of other wavelength components.

The light transmitted by the dual-band pass filter (DBP) 12 is the two wavelength light components, which are the R (red) component that is the wavelength light near approximately 650 nm and the NIR (near-infrared) component that is the wavelength light near approximately 900 nm.

As a result, a pixel value of the B pixel that is the pixel configuring the image pickup device (image sensor) 14 is a pixel value corresponding to a signal obtained by adding up signals S3 and S4 depicted in FIG. 3B.

In other words, the following equation is established.

Pixel value of B pixel: Braw=S3+S4

It is noted that it is possible to calculate an R (red) signal, an NIR (near-infrared) signal, and a wavelength light component as follows, using the pixel values of these R and B pixels.

It is understood as follows from FIGS. 3A and 3B: S2≈S4 and S3≈0.

Using this relationship, it is possible to calculate an R (red) component signal that is the wavelength light near approximately 650 nm by the following calculation equation.

$$R=(S1+S2)-(S3+S4)=Rraw-Braw$$

Using the above equation, a high precision value of the R (red) component signal contained in the subject can be calculated from a R pixel value (Rraw) and a B pixel value (Braw) of the raw images on the image pickup device.

Likewise, an NIR (near-infrared) component signal that is the wavelength light near approximately 900 nm is expressed by the following equation.

$$NIR=S4\approx(S3+S4)=Braw$$

Using the above equation, a high precision value of the NIR (near-infrared) component signal contained in the subject can be calculated from the B pixel value (Braw) on the image pickup device.

In such way, it is possible to calculate the high precision values of the signals (R and NIR) in a specific wavelength band on the basis of the pixel values (Rraw and Braw) of the pixels input to the image pickup device (image sensor) 14 via the dual-band pass filter (DBP) 12 and the color filter (RGB color filter) 13.

Using this analysis value makes it possible to highly precisely calculate, for example, the vegetation activity index.

It is noted that matrix computing is generally used in a case of calculating true pixel values in the specific wavelength band from the pixel values of the raw images output from the image pickup device (image sensor) 14 of the multispectral camera 10 as depicted in FIG. 1. It is possible to calculate, for example, high precision values of the R (red) component signal and the NIR (near-infrared) component signal using the R pixel value (Rraw) and the B pixel value (Braw) that are the raw image pixel values obtained as output from the image pickup device.

[Math. 1]

$$\begin{pmatrix} RED \\ NIR \end{pmatrix} = \begin{pmatrix} G1 & G2 \\ G3 & G4 \end{pmatrix} \begin{pmatrix} Rraw \\ Braw \end{pmatrix} \quad \text{(Equation 11)}$$

Appropriately selecting values of G1, G2, G3, and G4 that are matrix elements of a matrix of (Equation 11) above makes it possible to efficiently and highly precisely calculate signals in the RED band and the NIR band.

As a simplest example, it is assumed that a signal level in the R (red) band (signal S3 in FIG. 3B) contained in the B pixel value (Braw) is low, and that the matrix elements are G1=1, G2=−1, G3=0, and G4=1. Using such a matrix and using a signal calculation equation similar to that previously described, that is, $$R=Rraw-Braw$$

$$NIR=Braw,$$

it is possible to perform the same calculation process as above.

However, separation characteristics for separating the signal in the R (red) band and the signal in the NIR (near-infrared) band are insufficient; thus, it is difficult to obtain a high precision result.

Moreover, with a change in a light source or the subject, a ratio of a "signal level in the NIR (near-infrared) band (signal S4 in FIG. 3B) contained in the B pixel value (Braw)" to a "signal level in the R (red) band (signal S1 in FIG. 3A contained in the E pixel value (Rraw)" changes; thus, it is difficult to obtain high precision values even if the pixel value in each band is calculated using the same values as those of the matrix elements (G1 to G4).

While the RGB filter is used as the color filter 13 in the configuration depicted in FIG. 1, it is possible to calculate a high precision value of each wavelength of RGB colors by using, for example, an RGBIR filter depicted in FIG. 4 as the color filter 13.

Each IR (infrared) region in the RGBIR filter depicted in FIG. 4 is a region where a near-infrared (NIR) light component is transmitted.

It is noted, however, that any of the R, G, B, and IR regions in the filter are not capable of completely cutting off the other wavelength components; thus, not a few other wavelength components are transmitted.

Figure 5:
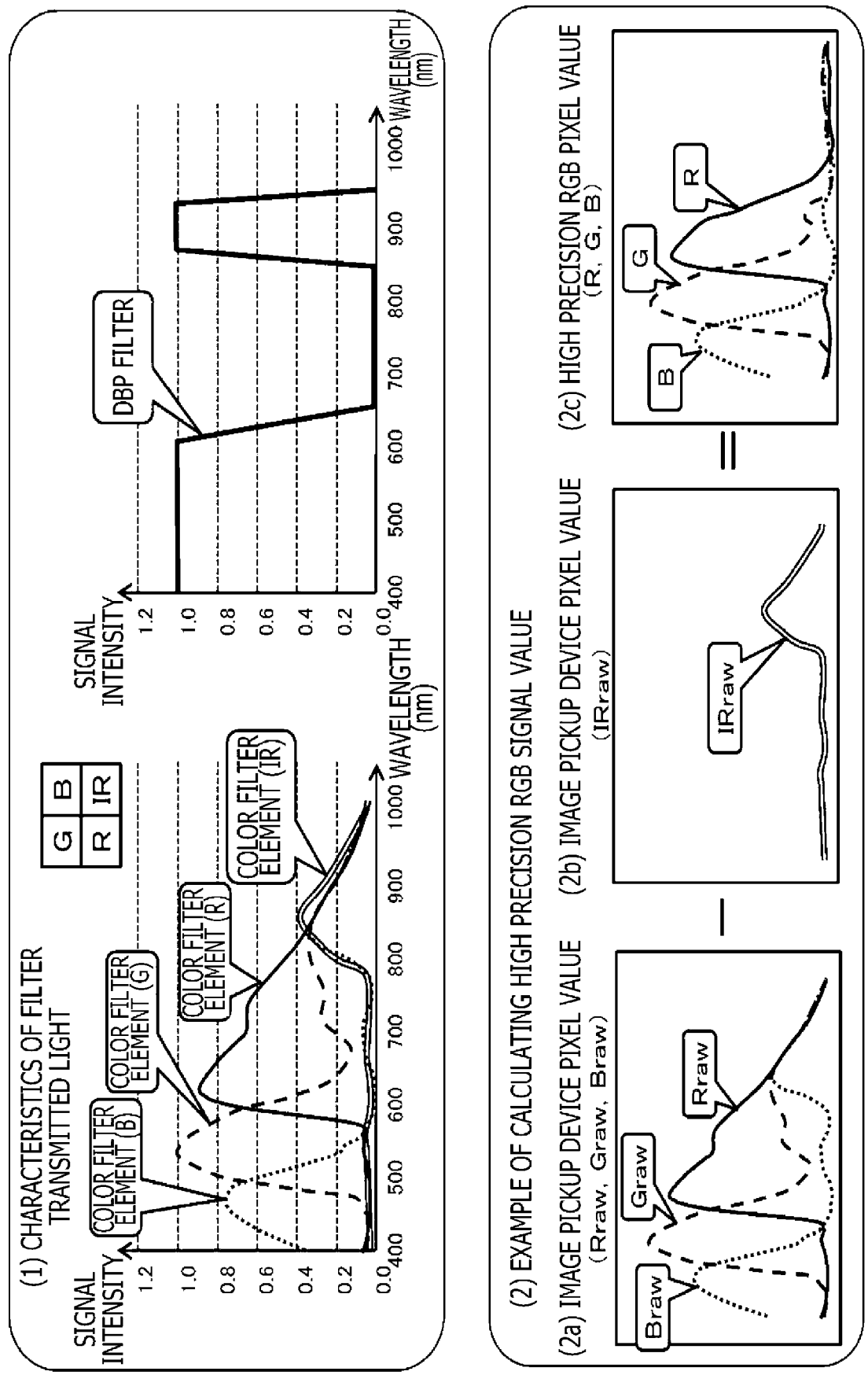
FIG. 5 illustrates explanatory diagrams of intensity distributions of light transmitted by an RGBIR filter and a DBP filter at certain image capturing time, and an example of a high precision RGB pixel value calculation process.

FIG. 5(1) depicts intensity distributions of light transmitted by the RGBIR filter and the DBP filter at certain image capturing time. A left side of FIG. 5(1) illustrates intensity distribution data regarding the transmitted light in each region of RGBIR regions in the RGBIR filter, and a right side thereof illustrates intensity distribution data regarding the light transmitted by the DBP filter.

In the present example, the DBP filter is a dual-band pass filter that transmits light in a visible light band equal to or lower than approximately 660 nm and light in the NIR band near 900 nm as depicted in a right graph of FIG. 5(1).

FIG. 5(2) is an explanatory diagram of an example of a calculation process of calculating high precision RGB pixel values.

As depicted in FIG. 5(2), (2a) from image pickup device pixel values (Rraw, Graw, and Braw) (=raw image pixel values), (2b) an image pickup device pixel value (IRraw) (=raw image pixel value) is subtracted.

This subtraction process makes it possible to calculate (2c) high precision RGB pixel values (RGB).

As understood from the intensity distribution data regarding the transmitted light in each region of the RGBIR regions depicted on a left side of FIG. 5(1), an IR component in the intensity distribution data regarding the transmitted light in each region of the RGBIR regions in the RGBIR filter has a generally common value.

In other words, the IR component (noise component) contained in the transmitted light in each region of the RGB regions in the RGBIR filter is generally identical to the IR component contained in the transmitted light in the IR region in the RGBIR filter.

Therefore, by subtracting the raw image pixel value (IRraw) formed on the image pickup device by the transmitted light in the IR region in the RGBIR filter from the raw image pixel values (Rraw, Graw, and Braw) formed on the image pickup device by the transmitted light in each region of the RGB regions in the RGBIR filter, it is possible to subtract the IR component (noise component) contained in the transmitted light in each region of the RGB regions in the RGBIR filter and to calculate the high precision RGB pixel values (RGB) depicted in FIG. 5(2c).

This process example is a process example of obtaining the high precision RGB values by combining the RGB+IR color filter with the DBP filter exhibiting two band pass characteristics which are the visible light region and the NIR (near-infrared NIR).

However, in this process example, while an infrared signal is removed from the high precision RGB values finally obtained and depicted in FIG. 5(2c), noise components other than that in the infrared region remain in the RGB values. In other words, in this process example, signal extraction in each of RGB narrow bands is not realized and an acquisition process of acquiring true high precision RGB pixel values is not realized.

2. Configurations and Processes of Image Pickup Apparatus and Image Processing Apparatus According to Embodiment of Present Disclosure Configurations and processes of the image pickup apparatus and the image processing apparatus according to an embodiment of the present disclosure will next be described. It is noted that the image pickup apparatus is a configuration example of the image processing apparatus, and that the image processing apparatus includes the image pickup apparatus in the following description.

The image processing apparatus according to the embodiment of the present disclosure is configured to be capable of acquiring a narrow band signal with less noise, for example, a signal (pixel value) in a specific band with less noise of each of R, G, B, and IR bands, per wavelength band restricted, by performing a signal process on a captured image on the basis of light transmitted by a color filter and a multi-band pass filter (MBP).

The image processing apparatus according to the embodiment of the present disclosure has a configuration using, for example, the multi-band pass filter (MBP) in response to a configuration of the color filter.

In other words, the multi-band pass filter (MBP) of the image pickup apparatus that is an example of the image processing apparatus according to the embodiment of the present disclosure has a configuration of selectively transmitting band light corresponding to a plurality of color filter elements that configures the color filter of the image pickup apparatus.

Specifically, in a case, for example, in which the color filter of the image pickup apparatus is an RGB color filter, the image processing apparatus uses a multi-band pass filter (MBP) exhibiting characteristics of transmitting three wavelengths of R, G, and B.

Furthermore, in a case in which the color filter of the image pickup apparatus is an RGBIR color filter, the image processing apparatus uses a multi-band pass filter (MBP) exhibiting characteristics of transmitting four wavelengths of R, G, B, and IR.

In such way, by using the multi-band pass filter (MBP) in response to the configuration of the color filter, it is possible to enhance the separation performance for separating band signals corresponding to types of filter elements that configure the color filter such as the RGB color filter or the RGBIR color filter.

Figure 6:
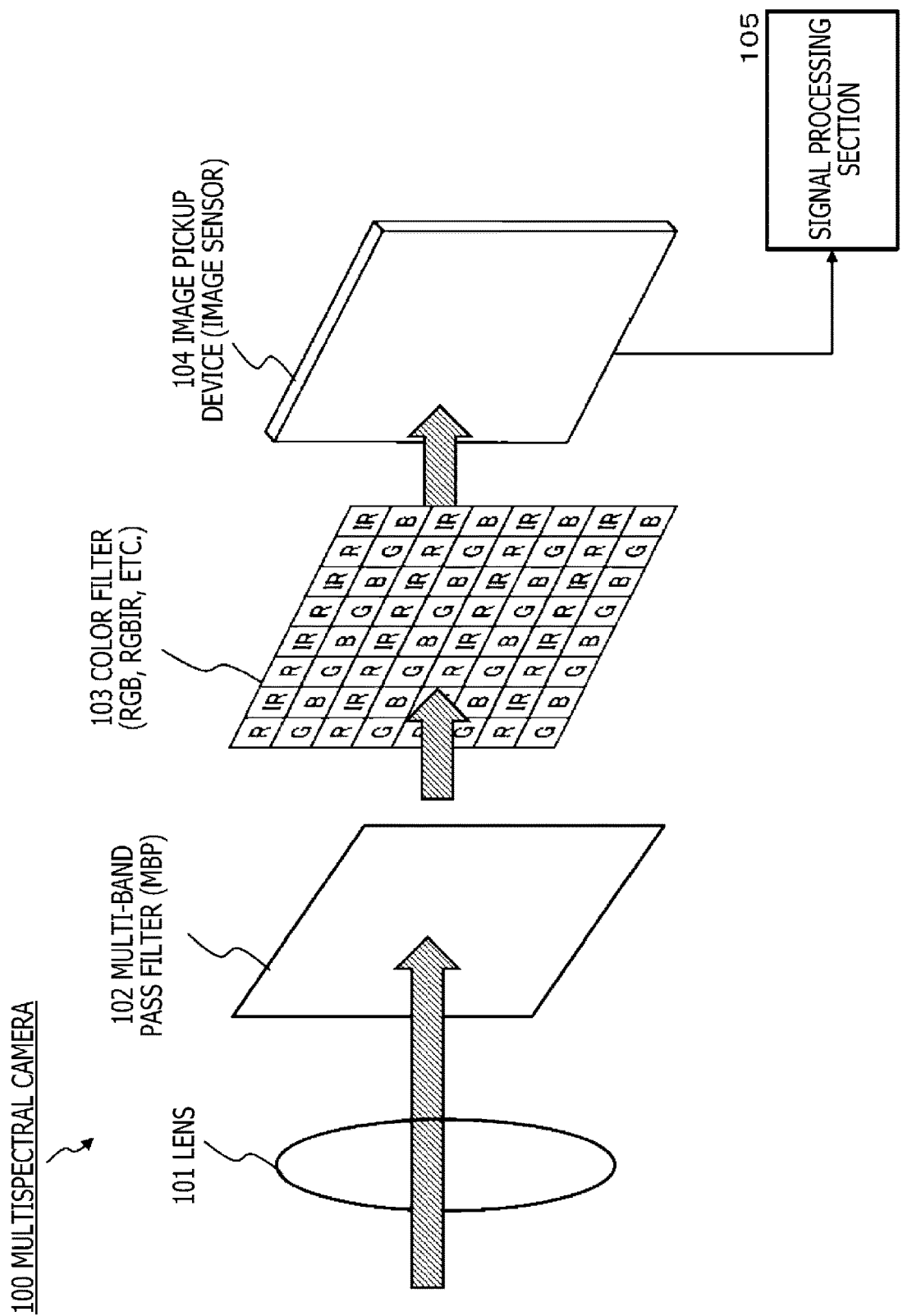
FIG. 6 is an explanatory diagram of an example of a configuration of a multispectral camera that is a configuration example of an image processing apparatus according to an embodiment of the present disclosure.

FIG. 6 depicts an example of a configuration of a multi-spectral camera 100 that is a configuration example of the image processing apparatus according to the embodiment of the present disclosure.

In the multispectral camera 100 depicted in FIG. 6, photographic light of a subject input via a lens 101 is input to an image pickup device (image sensor) 104 via a multi-band pass filter (MBP) 102 and a color filter (RGBIR color filter) 103.

Furthermore, pixel values (Rraw, Graw, Braw, and IRraw) of the image pickup device (image sensor) 104 are input to a signal processing section 105 and subjected to a signal process.

The signal processing section 105 removes noise components from the pixel values (Rraw, Graw, Braw, and Iraw) of the image pickup device (image sensor) 104, and calculates high precision values of R, G, B, and IR signals.

The multi-band pass filter (MBP) 102 is a filter corresponding to a filter element configuration of the color filter 103, and selectively transmits band light corresponding to a plurality of color filter elements that configure the color filter 103. In other words, the multi-band pass filter (MBP) 102 is a filter that selectively transmits light of four different color components that are as many as the types of color filter elements that configures the color filter 103.

In the configuration depicted in FIG. 6, the color filter (RGBIR color filter) 103 has four types of filter element regions which are R, G, B, and IR filter element regions. In this case, the multi-band pass filter (MBP) 102 is the filter that selectively transmits these four types of wavelengths which are wavelengths of R, G, B, and IR.

An example of distribution data regarding wavelength light input to the RGBIR pixels of the image pickup apparatus 104 will be described with reference to FIG. 7.

Figure 7:
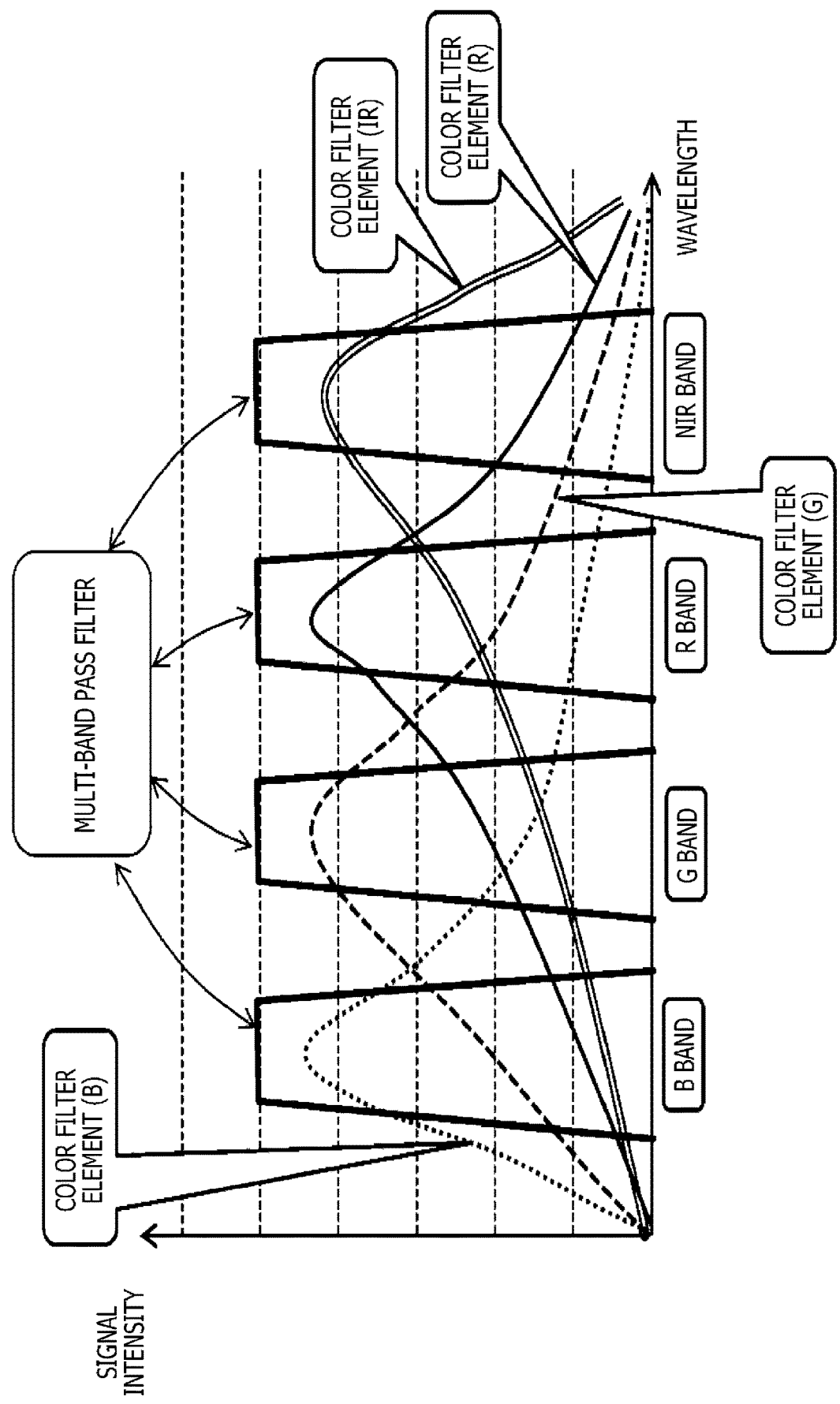
FIG. 7 is an explanatory diagram of spectral characteristics of a multi-band pass filter (MBP) and a color filter (RGBIR color filter).

FIG. 7 is a diagram depicting spectral characteristics of the multi-band pass filter (MBP) 102 and the color filter (RGBIR color filter) 103.

A horizontal axis indicates a wavelength (400 to 1000 nm) and a vertical axis indicates a signal intensity (relative value) of filter transmitted light.

According to graphs, while light transmitted by each color filter element (B) configuring the color filter (RGB color filter) 103 is mostly the B (blue) component that is wavelength light near approximately 450 nm, the color filter element (B) transmits not a little light of other wavelength components.

Furthermore, while light transmitted by each color filter element (G) is mostly the G (green) component that is wavelength light near approximately 540 nm, the transmitted light contains light of other wavelength components.

While light transmitted by each color filter element (R) is mostly the R (red) component that is wavelength light near approximately 650 nm, the transmitted light contains light of other wavelength components.

Likewise, while light transmitted by each color filter element (IR) is mostly an NIR (near-infrared) component that is wavelength light near approximately 950 nm, the transmitted light contains light of other wavelength components.

Moreover, light transmitted by the multi-band pass filter (MBP) 102 is the following four types of wavelength components selectively transmitted on an entire surface of the multi-band pass filter (MBP) 102.

(1) The B (blue) component that is wavelength light near approximately 450 nm, (2) The G (green) component that is wavelength light near approximately 540 nm, (3) The R (red) component that is wavelength light near approximately 650 nm, and (4) The NIR (near-infrared) component that is wavelength light near approximately 900 nm.

The light passing through the multi-band pass filter (MBP) 102 and each R (red) filter element in the color filter (RGBIR color filter) 103 is input to one R pixel on the image pickup device (image sensor) 104, that is, the R pixel that is the pixel receiving the light transmitted by one R region in the color filter 103. A pixel value on the image pickup device in response to this input light, that is, a pixel value of the R pixel of the raw image, is defined as Rraw.

The light passing through the multi-band pass filter (MBP) 102 and each G (green) filter element in the color filter (RGBIR color filter) 103 is input to one G pixel on the image pickup device (image sensor) 104. A pixel value on the image pickup device in response to this input light, that is, a pixel value of the G pixel of the raw image, is defined as Graw.

The light passing through the multi-band pass filter (MBP) 102 and each B (blue) filter element in the color filter (RGBIR color filter) 103 is input to one B pixel on the image pickup device (image sensor) 104. A pixel value on the image pickup device in response to this input light, that is, a pixel value of the B pixel of the raw image, is defined as Braw.

The light passing through the multi-band pass filter (MBP) 102 and each NIR (near-infrared) filter element in the color filter (RGBIR color filter) 103 is input to one IR pixel on the image pickup device (image sensor) 104. A pixel value on the image pickup device in response to this input light, that is, a pixel value of the IR pixel of the raw image, is defined as IRraw.

Each of the raw image pixel values: Rraw, Graw, Braw, and IRraw, of the image pickup device 104 contains not only a narrow band signal such as each of the R, G, B, and IR signals but also noise of other wavelengths.

The raw image pixel values (Rraw, Graw, Braw, and IRraw) of the image pickup device 104 are input to the signal processing section 105, and the signal processing section 105 removes the noise component from each of these pixel values and calculates a high precision pixel value of each wavelength of each of the R, G, B, and IR signals.

A specific example of a signal process executed by the signal processing section 105 will be described with reference to FIG. 8 and the following drawings.

Note that, in the following description, for the purpose of explaining the configurations and processes according to the embodiment of the present disclosure in a generalized manner, the color filter 103 will be described as a color filter configured by an ABCD color filter that transmits four different types of wavelength signals A to D as depicted in FIG. 8.

The ABCD color filter is a color filter configured from the following four types of band-pass filters:

an A band-pass filter element that mainly transmits wavelength light in a band A, a B band-pass filter element that mainly transmits wavelength light in a band B, a C band-pass filter element that mainly transmits wavelength light in a band C, and a D band-pass filter element that mainly transmits wavelength light in a band D.

It is noted that the image processing apparatus according to the embodiment of the present disclosure can use the color filter of any of various configurations. The image processing apparatus according to the embodiment of the present disclosure can use an RGB color filter of three colors, an RGBIR color filter of four colors, or any of color filters of various other configurations.

As a representative example, a configuration and a process example in a case of using the color filter configured by a filter that transmits four different types of wavelength signals in the wavelength bands A to D depicted in FIG. 8 will be described below.

Figure 9:
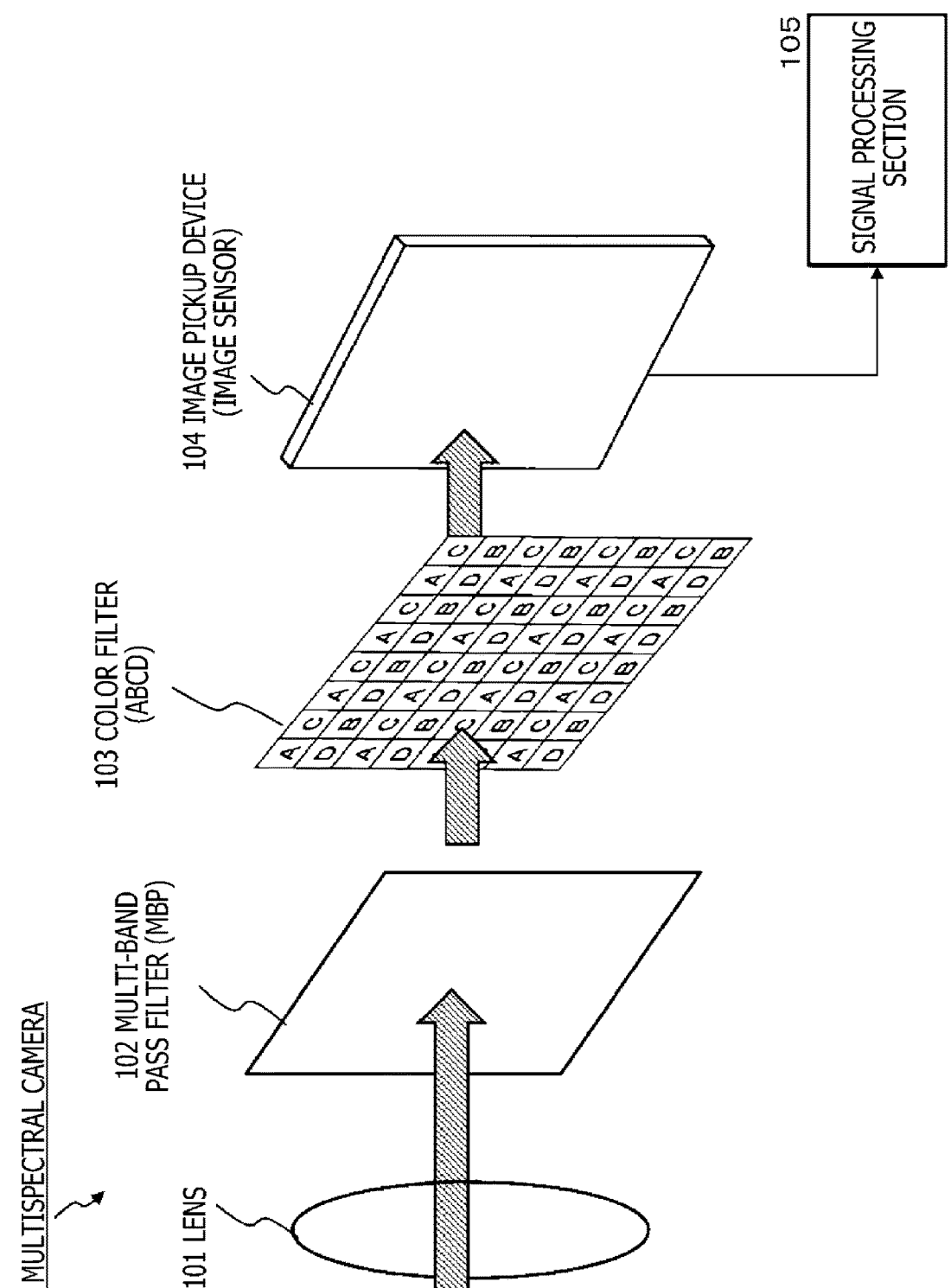
FIG. 9 is an explanatory diagram of an example of a configuration of a multispectral camera that is a configuration example of an image processing apparatus according to an embodiment of the present disclosure using the ABCD color filter depicted in FIG. 8.

FIG. 9 is a diagram depicting the multispectral camera 100 that is a configuration example of the image processing apparatus according to the embodiment of the present disclosure using the ABCD color filter depicted in FIG. 8.

The multispectral camera 100 depicted in FIG. 9 is configured such that the RGBIR color filter in the multispectral camera 100 previously described with reference to FIG. 6 is replaced by the ABCD color filter configured from A, B, C, and D band-pass filter elements configured as depicted in FIG. 8.

The multi-band pass filter (MBP) 102 is a filter that selectively transmits signals in the four different types of wavelength bands corresponding to the four types of filter elements A to D that configure the ABCD color filter.

Figure 10:
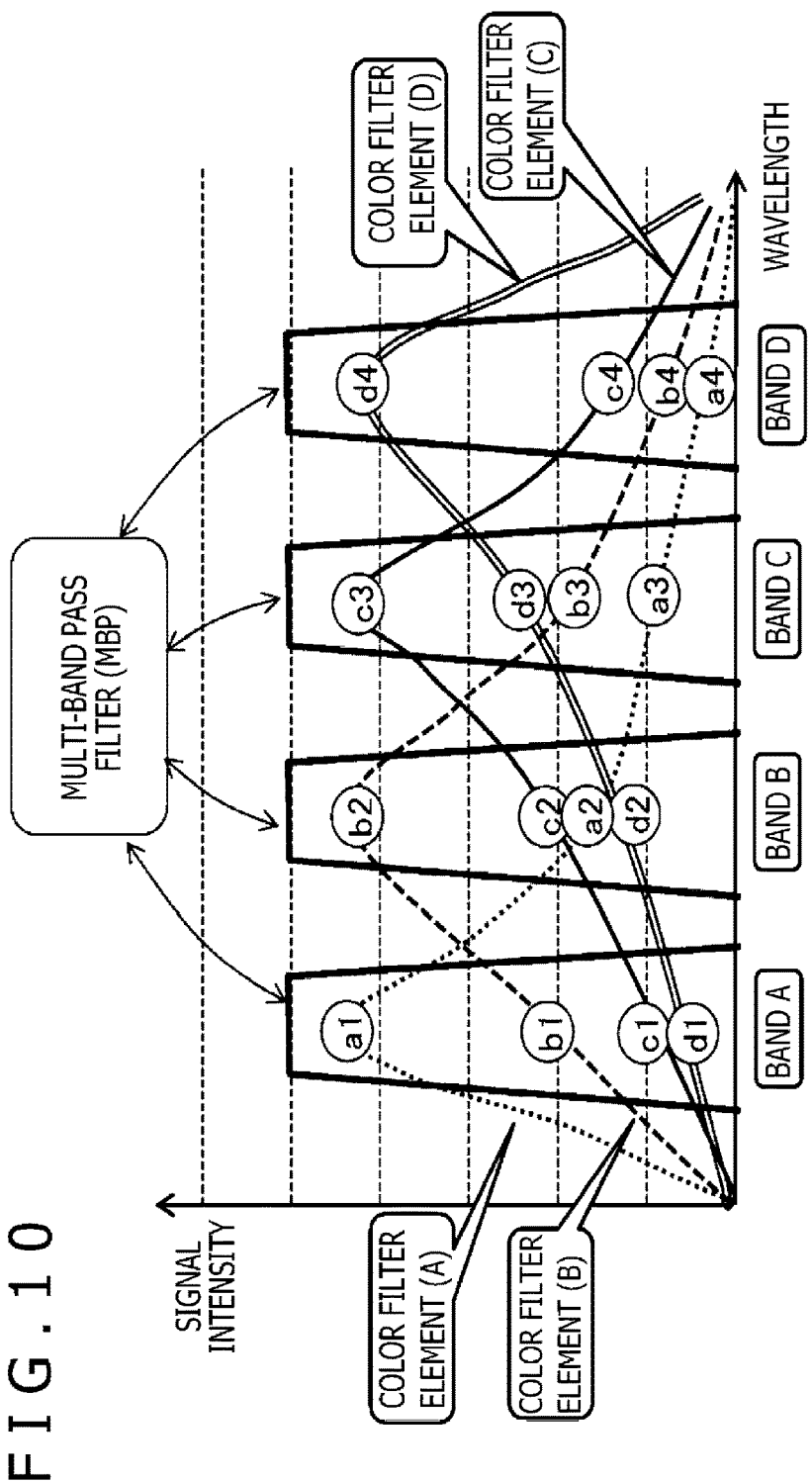
FIG. 10 is an explanatory diagram of spectral characteristics of a multi-band pass filter (MBP) and a color filter (ABCD color filter).

FIG. 10 is a diagram depicting spectral characteristics of the multi-band pass filter (MBP) 102 and the color filter (ABCD color filter) 103, similarly to FIG. 7 previously described.

A horizontal axis indicates a wavelength (400 to 1000 nm) and a vertical axis indicates a signal intensity (relative value) of filter transmitted light.

While light transmitted by each color filter element (A) configuring the color filter (RGB color filter) 103 is mostly wavelength light near the band A, the color filter element (A) transmits not a little light of other wavelength components.

Furthermore, while light transmitted by each color filter element (B) is mostly wavelength light near the band B, the color filter element (B) transmits not a little light of other wavelength components.

Moreover, while light transmitted by each color filter element (C) is mostly wavelength light near the band C, the color filter element (C) transmits not a little light of other wavelength components.

Furthermore, while light transmitted by each color filter element (D) is mostly wavelength light near the band D, the color filter element (D) transmits not a little light of other wavelength components.

Furthermore, light transmitted by the multi-band pass filter (MBP) 102 is light of the four types of wavelength components selectively transmitted by the multi-band pass filter (MBP) 102 on the entire surface thereof.

The light passing through the multi-band pass filter (MBP) 102 and each A band-pass filter element in the color filter (ABCD color filter) 103 is input to one A pixel on the image pickup device (image sensor) 104, that is, the A pixel that receives the light transmitted by one region A on the color filter 103. A raw image pixel value of the A pixel is defined as Araw.

The light passing through the multi-band pass filter (MBP) 102 and each B band-pass filter element in the color filter (ABCD color filter) 103 is input to one B pixel on the image pickup device (image sensor) 104. A raw image pixel value of the B pixel is defined as Braw.

The light passing through the multi-band pass filter (MBP) 102 and each C band-pass filter element in the color filter (ABCD color filter) 103 is input to one C pixel on the image pickup device (image sensor) 104. A raw image pixel value of the C pixel is defined as Craw.

The light passing through the multi-band pass filter (MBP) 102 and each D band-pass filter element in the color filter (ABCD color filter) 103 is input to one D pixel on the image pickup device (image sensor) 104. A raw image pixel value of the D pixel is defined as Draw.

Each of the raw image pixel values: Araw, Braw, Craw, and Draw, of the image pickup device 104 contains not only a narrow band signal such as each of the A, B, C, and D signals but also noise of other wavelengths.

The raw image pixel values (Araw, Braw, Craw, and Draw) of the image pickup device 104 are input to the signal processing section 105, and the signal processing section 105 removes the noise component from each of these pixel values and calculates a high precision pixel value in each of the bands A, B, C, and D.

Equations of calculating the pixel values Araw, Braw, Craw, and Draw on the image pickup device 104 are depicted in a lower portion of FIG. 10. The raw image pixel values Araw, Braw, Craw, and Draw on the image pickup device 104 can be calculated by the following calculation equations.

$$Araw = a1 + a2 + a3 + a4$$

$$Braw = b1 + b2 + b3 + b4$$

$$Craw = c1 + c2 + c3 + c4$$

$$Draw = d1 + d2 + d3 + d4$$

Corresponding to points depicted on graphs of FIG. 10, and to the following signals are a1, b2, c3, and d4.

a1=a signal component in the band A contained in the raw image pixel value Araw, a2=a signal component in the band B contained in the raw image pixel value Araw, a3=a signal component in the band C contained in the raw image pixel value Araw, a4=a signal component in the band D contained in the raw image pixel value Araw, b1=a signal component in the band A contained in the raw image pixel value Braw, b2=a signal component in the band B contained in the raw image pixel value Braw, b3=a signal component in the band C contained in the raw image pixel value Braw, b4=a signal component in the band D contained in the raw image pixel value Braw, c1=a signal component in the band A contained in the raw image pixel value Craw, c2=a signal component in the band B contained in the raw image pixel value Craw, c3=a signal component in the band C contained in the raw image pixel value Craw, c4=a signal component in the band D contained in the raw image pixel value Craw, d1=a signal component in the band A contained in the raw image pixel value Draw, d2=a signal component in the band B contained in the raw image pixel value Draw, d3=a signal component in the band C contained in the raw image pixel value Draw, and d4=a signal component in the band D contained in the raw image pixel value Draw.

It is noted that only the signal a1 corresponds to the band A among the signal components a1 to a4 contained in the raw image pixel value Araw of the A pixel on the image pickup device 104, and the other signal components a2, a3, and a4 correspond to noise signals.

Likewise, only the signal b2 corresponds to the band B among the signal components b1 to b4 contained in the raw image pixel value Braw of the B pixel on the image pickup device 104, and the other signal components b1, b3, and b4 correspond to noise signals.

Likewise, only the signal c3 corresponds to the band C among the signal components c1 to c4 contained in the raw image pixel value Craw of the C pixel on the image pickup device 103, and the other signal components c1, c2, and c4 correspond to noise signals.

Likewise, only the signal d4 corresponds to the band D among the signal components d1 to d4 contained in the raw image pixel value Draw of the D pixel on the image pickup device 103, and the other signal components d1, d2, and d3 correspond to noise signals.

The raw image pixel values (Araw to Draw) each containing the noise components are input from the image pickup device 104 to the signal processing section 105, and the signal processing section 105 executes a process of removing the noise components from each of these pixel values and calculating each of true pixel values (a1, b2, c3, and d4) corresponding to the band that is each of the bands A to D.

Processes executed by the signal processing section 105 will be described with reference to FIG. 11 and the following drawings.

Figure 11:
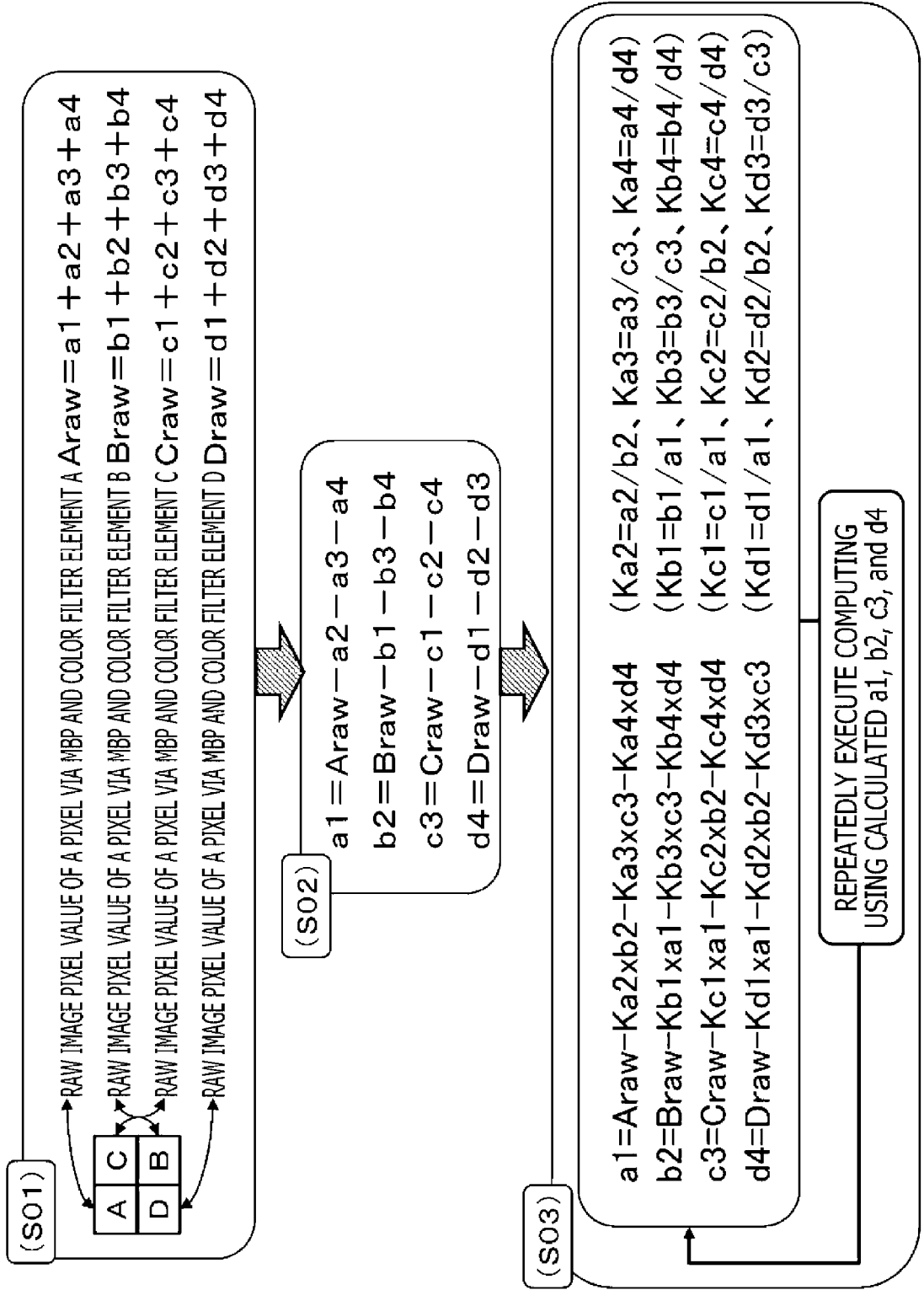
FIG. 11 is an explanatory diagram of processes executed by a signal processing section.

FIG. 11 is an explanatory diagram of an outline of the processes executed by the signal processing section 105.

The signal processing section 105 executes the processes in Steps S01 to S03 depicted in FIG. 11.

(Step S01)

Step S01 depicted in FIG. 11 is a process performed by the signal processing section 105 for generating an equation of calculating each of raw image base pixel values (Araw to Draw) per pixel on the basis of the input pixel value from the image pickup device 104.

In (S01) of FIG. 11, the equation of calculating each of the raw image base pixel values (Araw to Draw) per pixel generated on the basis of the raw image input from the image pickup device 104, that is, the equation of calculating each of the following raw image pixel values (Equations 21), is depicted.

$$Araw = a1 + a2 + a3 + a4$$

$$Braw = b1 + b2 + b3 + b4$$

$$Craw = c1 + c2 + c3 + c4$$

$$Draw = d1 + d2 + d3 + d4 \quad \text{(Equations 21)}$$

It is noted that these raw image base pixel values (Araw to Draw) are each generated per pixel on the image pickup device, and subjected to the processes in Steps S01 to S03 per pixel. In addition, the signal processing section 105 removes the noise components from each of the raw image base pixel values (Araw to Draw) per pixel and calculates each of the true pixel values (a1, b2, c3, and d4) corresponding to the band that is each of the bands A to D.

While the raw image input from the image pickup device 104 is the raw image in which the A, B, C, or D pixel value is set to each pixel in response to arrangement of the ABCD color filter, the signal processing section 105 executes a demosaicing process on this raw image and sets the A, B, C, or D pixel value to each pixel on the image pickup device 104. Each of the raw image base pixel values (Araw to Draw) depicted in (Equations 21) above is the pixel value of one identical pixel after this demosaicing process.

It is noted that the image processing section 105 may be configured to omit such a demosaicing process and to execute the processes in Steps S01 to S03 per predetermined pixel block.

For example, 2×2 ABCD pixels on the image pickup device, that is, a block of four pixels, are assumed as one process block, and the image processing section 105 can be configured to process the four raw image pixel values (Araw to Draw) in this one process block as the raw image base pixel values (Araw to Draw) of the entire four pixels. In this case, a similar noise reduction effect can be obtained although a resolution is lowered.

(Step S02)

Next, in Step S02, the signal processing section 105 generates the equations of calculating the true pixel values (a1, b2, c3, and d4) corresponding to the noise-removed bands A to D from the above raw image base pixel values (Araw to Draw).

As depicted in (S02) of FIG. 11, the equations of calculating the true pixel values (a1, b2, c3, and d4) corresponding to the bands A to D are expressed by the following (Equations 22).

$$a1 = Araw - a2 - a3 - a4$$

$$b2 = Braw - b1 - b3 - b4$$

$$c3 = Craw - c1 - c2 - a4$$

$$d4 = Draw - d1 - d2 - d3 \quad \text{(Equations 22)}$$

The (Equations 22) are obtained by expanding the equations (Equations 21) of calculating the raw image base pixel values (Araw to Draw) depicted in (Step S01) above.

(Step S03)

Next, in Step S03, the signal processing section 105 replaces noise component data contained in the equations of calculating the true pixel values (a1, b2, c3, and d4) corresponding to the bands generated in (Step S02) above, with spectral characteristic parameters (Kan to Kdn) of the multispectral camera 100, and generates equations of calculating the pixel values corresponding to the bands to calculate the true pixel values (a1, b2, c3, and d4) corresponding to the bands A to D as expressed in the following (Equations 23).

It is noted that the spectral characteristic parameters (Kan to Kdn) are camera-unique parameters and values measured in advance are stored in the memory.

$$a1 = Araw - Ka2 \times b2 - Ka3 \times c3 - Ka4 \times d4$$

$$b2 = Braw - Kb1 \times a1 - Kb3 \times c3 - Kb4 \times d4$$

$$c3 = Craw - Kc1 \times a1 - Kc2 \times b2 - Kc4 \times d4$$

$$d4 = Draw - Kd1 \times a1 - Kd2 \times b2 - Kd3 \times c3 \quad \text{(Equations 23)}$$

The spectral characteristic parameters (Kan to Kdn) of the multispectral camera 100 used in (Equations 23) above are as follows.

$$Ka2 = a2/b2$$

$$Ka3 = a3/c3$$

$$Ka4 = a4/d4$$

$$Kb1 = b1/a1$$

$$Kb3 = b3/c3$$

$$Kb4 = b4/d4$$

$$Kc1 = c1/a1$$

$$Kc2 = c2/b2$$

$$Kc4 = c4/d4$$

$$Kd1 = d1/a1$$

$$Kd2 = d2/b2$$

$$Kd3 = d3/c3$$

For example, Ka2=a2/b2 is a ratio (a2/b2) of a transmitted signal a2 by the filter A to a transmitted signal b2 by the filter B in a band B region in the graphs depicted in FIG. 10.

Ka3=a3/c3 is a ratio (a3/c3) of a transmitted signal a3 by the filter A to a transmitted signal c2 by the filter C in a band C region in the graphs depicted in FIG. 10.

Ka4=a4/cd is a ratio (a4/d4) of a transmitted signal a4 by the filter A to a transmitted signal d4 by the filter D in a band D region in the graphs depicted in FIG. 10.

Kb1=b1/a1 is a ratio (b1/a1) of a transmitted signal b1 by the filter B to a transmitted signal a1 by the filter A in a band A region in the graphs depicted in FIG. 10.

The same thing is true for the subsequent spectral characteristic parameters. Each of the spectral characteristic parameters of the multispectral camera 100 is an intensity ratio of the light transmitted by a plurality of different color filter elements that configures the color filter in a specific band, that is, an intensity ratio in a band in which the light is transmitted by the multi-band pass filter.

In the present example, the spectral characteristic parameters (Kan to Kdn) of the multispectral camera 100 are data regarding ratios of the signals transmitted by the filter elements A to D that configure the color filter in the bands A to D.

These spectral characteristic parameters (Kan to Kdn) are camera-unique parameters and are values that can be measured in advance.

The multispectral camera 100 that is the image processing apparatus according to the embodiment of the present disclosure stores the spectral characteristic parameters (Kan to Kdn) of the multispectral camera 100 in the memory, and calculates a1, b2, c3, and d4 by substituting the parameters acquired from the memory into the equations of calculating the true pixel values (a1, b2, c3, and d4) corresponding to the bands depicted in (Step S03) of FIG. 11, that is, the equations of calculating the pixel values corresponding to the bands (Equations 23).

$$a1 = Araw - Ka2 \times b2 - Ka3 \times c3 - Ka4 \times d4$$

$$b2 = Braw - Kb1 \times a1 - Kb3 \times c3 - Kb4 \times d4$$

$$c3 = Craw - Kc1 \times a1 - Kc2 \times b2 - Kc4 \times d4$$

$$d4 = Draw - Kd1 \times a1 - Kd2 \times b2 - Kd3 \times c3 \quad \text{(Equations 23)}$$

It is noted that the multispectral camera 100 may be configured to acquire the spectral characteristic parameters (Kan to Kdn) of the multispectral camera 100 from, for example, an external apparatus or an external server.

First, the signal processing section 105 inputs the following raw image base pixel values (Araw to Draw) as initial values of a1, b2, c3, and d4 on right side portions of the equations in (Equations 23) above.

a1=Araw
b2=Braw
c3=Craw
d4=Draw

By performing a process of substituting these values into the equations, the signal processing section 105 generates initial setting equations (Equations 24) of the equations of calculating the pixel values corresponding to the bands.

$$a1 = Araw - Ka2 \times Braw - Ka3 \times Craw - Ka4 \times Draw$$

$$b2 = Braw - Kb1 \times Araw - Kb3 \times Craw - Kb4 \times Draw$$

$$c3 = Craw - Kc1 \times Araw - Kc2 \times Braw - Kc4 \times Draw$$

$$d4 = Draw - Kd1 \times Araw - Kd2 \times Braw - Kd3 \times Craw \quad \text{(Equations 24)}$$

The signal processing section 105 further substitutes a1, b2, c3, and d4 calculated in accordance with the abovementioned initial setting equations (Equations 24) into the right side portions of the equations of calculating the pixel values corresponding to the bands (Equations 23) previously described, and calculates new values of a1, b2, c3, and d4.

Moreover, the signal processing section 105 substitutes the calculated values into the right side portions of the equations of calculating the pixel values corresponding to the bands (Equations 23), and calculates new values of a1, b2, c3, and d4.

The signal processing section 105 repeats this computing. In other words, the signal processing section 105 executes iterative calculation using the equations of calculating the pixel values corresponding to the bands (Equations 23) repeatedly a plurality of times.

By executing the iterative calculation using the abovementioned equations of calculating the pixel values corresponding to the bands (Equations 23) repeatedly a plurality of times, the values of a1, b2, c3, and d4 gradually converge.

Figure 12:
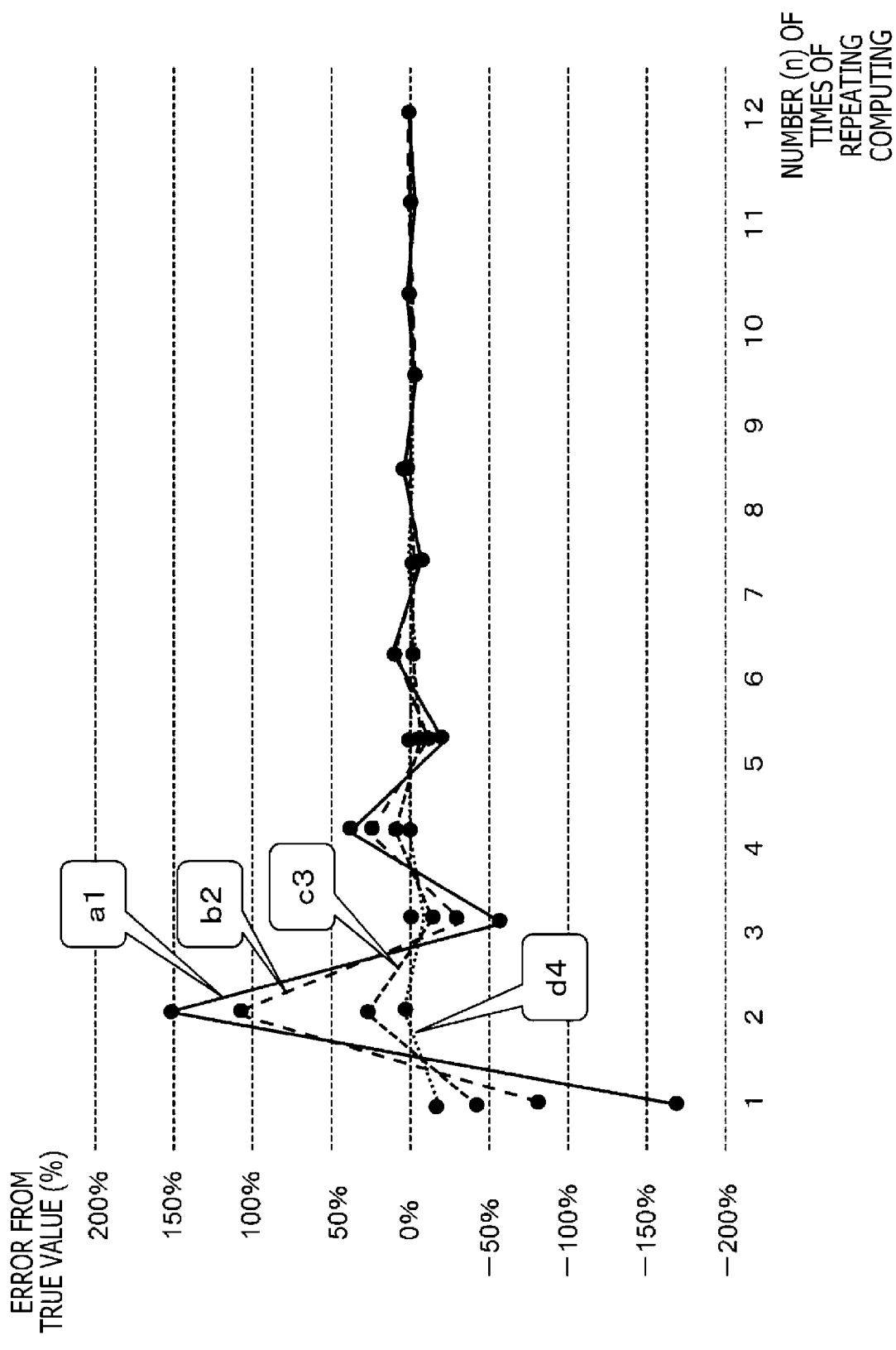
FIG. 12 is an explanatory diagram of an example of convergence of calculated values by iterative calculation using an equation of calculating a pixel value corresponding to a band.

FIG. 12 depicts an example of convergence of a1, b2, c3, and d4 by actual iterative calculation.

FIG. 12 depicts graphs with a horizontal axis indicating the number of times of executing calculation using the abovementioned equations of calculating the pixel values corresponding to the bands (Equations 23) and a vertical axis indicating an error (%) from a true value.

The graphs indicate transition of the values of a1, b2, c3, and d4 obtained by repeating calculation using the abovementioned (Equations 23).

As can be understood from the graphs, the values of a1, b2, c3, and d4 practically converge by executing the iterative calculation six to seven times.

The signal processing section 105 determines convergence values by the iterative calculation to which the abovementioned equations of calculating the pixel values corresponding to the bands (Equations 23) are applied as the true pixel values (a1, b2, c3, and d4) corresponding to the bands A to D.

To determine whether or not the pixel values (a1, b2, c3, and d4) are convergent by the iterative calculation to which the abovementioned equations of calculating the pixel values corresponding to the bands (Equations 23) are applied, a method of determining that the pixel values (a1, b2, c3, and d4) are convergent in a case, for example, in which every difference between calculation results of a plurality of pixel values by the n-th iterative calculation and calculation results thereof by the (n−1)-th iterative calculation immediately prior to the n-th iterative calculation is equal to or smaller than a predetermined threshold, for example, equal to or smaller than 5%, can be applied.

Alternatively, the multispectral camera 100 may be configured in such a manner that the number of times of executing the iterative calculation is set to a specified number of times such as six or seven in advance and the signal processing section 105 determines that pixel values (a1, b2, c3, and d4) are convergent at timing of end of the specified number of times of the iterative calculation.

The signal processing section 105 determines the convergence values of the iterative calculation results in Step S103 as the true pixel values (a1, b2, c3, and d4) corresponding to the bands A to D, respectively.

Executing the processes in Steps S01 to S03 per pixel enables the signal processing section 105 to calculate per pixel the true pixel values (a1, b2, c3, and d4) corresponding to the bands A to D for all the pixels that configure the image pickup device.

It is noted that the signal processing section 105 may be configured to execute the process per predetermined pixel block as described above and to calculate the true pixel values (a1, b2, c3, and d4) corresponding to the bands per block.

It is noted that the signal processing section 105 subsequently executes generation of the color image, analysis of the color components of the subject, and the like, using the calculated true pixel values (a1, b2, c3, and d4) corresponding to the bands A to D.

Examples of the analysis of the color components of the subject include a process of analyzing the NDVI (Normalized Difference Vegetation Index) that is the index value of the activity of vegetation described above. To calculate the NDVI of the vegetation in the captured image, red (RED) and near-infrared (NIR) values contained as color components of the vegetation that is the subject are necessary.

Specifically, the NDVI can be calculated in accordance with the following equation.

$$NDVI=(NIR-RED)/(NIR+RED)$$

In the above equation,
RED and NIR are intensities (pixel values) of a RED wavelength and a NIR wavelength in each pixel of the image.

Note that, while the signal processing section 105 per se may execute the generation of the color image, the analysis of the color components of the subject, and the like, the signal processing section 105 may output the true pixel values (a1, b2, c3, and d4) corresponding to the bands A to D calculated by the signal processing section 105 to a data processing section in rear of the signal processing section 105 and the data processing section may execute the generation, the analysis, and the like.

3. Sequence of Processes Executed by Image Processing Apparatus According to Embodiment of Present Disclosure Next, a sequence of processes executed by the image processing apparatus according to the embodiment of the present disclosure will be described.

The sequence of processes performed by the image processing apparatus, which is, for example, the multispectral camera 100 depicted in FIGS. 6 and 9 or the PC that executes processes on an input image from the camera, will be described with reference to a flowchart depicted in FIG. 13.

Figure 13:
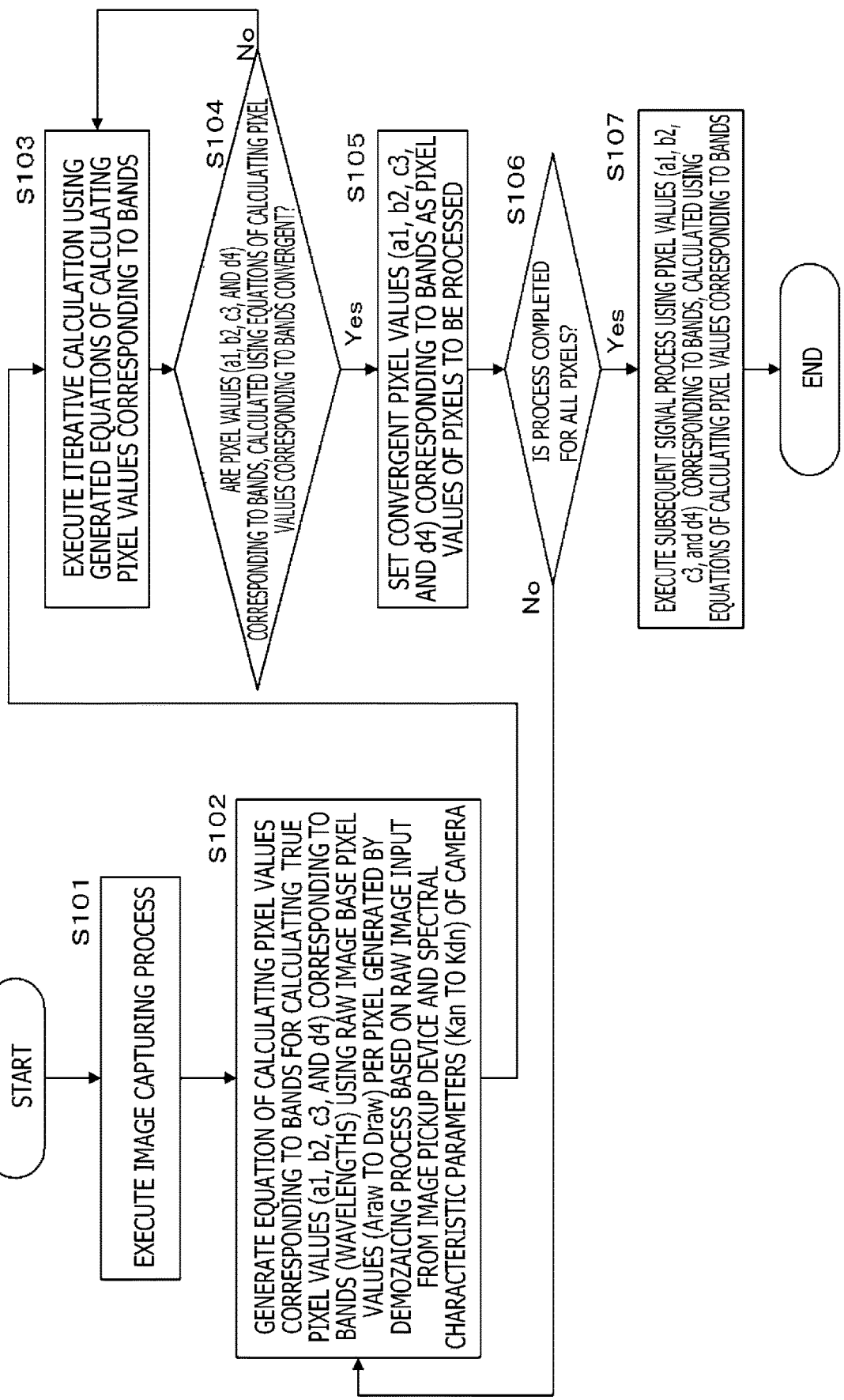
FIG. 13 is a diagram depicting a flowchart for explaining a sequence of processes executed by the multispectral camera.

It is noted that the processes according to the embodiment of the flowchart depicted in FIG. 13 can be executed in accordance with a program stored in the storage section of the image processing apparatus such as the image pickup apparatus or the PC. The data processing section in the image pickup apparatus or the image processing apparatus executes processes according to the flowchart depicted in FIG. 13 in accordance with the program stored in the storage section.

The processes in steps of a flow will hereinafter be described in sequence.

(Step S101)

First, the image pickup apparatus executes an image capturing process in Step S101.

The image pickup apparatus performs image capturing using the configuration depicted in FIG. 6 or 9. The light in response to the subject is input to the image pickup device (image sensor) 104 via the lens 101, the multi-band pass filter 102, and the color filter 103 by the image capturing process performed by the multispectral camera 100.

The pixels on the image pickup device (image sensor) 104 output the raw image pixel values (Araw to Draw) in response to the input light, to the signal processing section 105.

(Step S102)

Next, in Step S102, the signal processing section 105 of the image processing apparatus generates the equations of calculating the pixel values corresponding to the bands for calculating the true pixel values (a1, b1, c3, and d4) corresponding to the bands (wavelengths), using the raw image base pixel values (Araw to Draw) per pixel generated by a demosaicing process based on the raw image input from the image pickup device (image sensor) 104 and the spectral characteristic parameters (Kan to Kdn) of the camera.

It is noted that the processes in Steps S102 to S105 are executed per pixel.

In Step S102, the signal processing section 105 of the image processing apparatus generates the equations of calculating the pixel values corresponding to the bands, that is, the following equations of calculating the pixel values corresponding to the bands (Equations 23) previously described, for the pixels to be processed.

$$a1 = Araw - Ka2 \times b2 - Ka3 \times c3 - Ka4 \times d4$$

$$b2 = Braw - Kb1 \times a1 - Kb3 \times c3 - Kb4 \times d4$$

$$c3 = Craw - Kc1 \times a1 - Kc2 \times b2 - Kc4 \times d4$$

$$d4 = Draw - Kd1 \times a1 - Kd2 \times b2 - Kd3 \times c3 \quad \text{(Equations 23)}$$

(Step S103)

Next, in Step S103, the image processing apparatus executes an iterative calculation process using the equations of calculating the pixel values corresponding to the bands generated in Step S102.

In other words, first, the following raw image base pixel values (Araw to Draw) are input to the signal processing section 105 as the initial values of a1, b2, c3, and d4 in right side portions of the equations in the abovementioned (Equations 23).

a1=Araw
b2=Braw
c3=Craw
d4=Draw

By performing a process of substituting these values into the equations, the signal processing section 105 generates initial setting equations (Equations 24) of the equations of calculating the pixel values corresponding to the bands.

$$a1 = Araw - Ka2 \times Braw - Ka3 \times Craw - Ka4 \times Draw$$

$$b2 = Braw - Kb1 \times Araw - Kb3 \times Craw - Kb4 \times Draw$$

$$c3 = Craw - Kc1 \times Araw - Kc2 \times Braw - Kc4 \times Draw$$

$$d4 = Draw - Kd1 \times Araw - Kd2 \times Braw - Kd3 \times Craw \quad \text{(Equations 24)}$$

The signal processing section 105 further substitutes a1, b2, c3, and d4 calculated in accordance with the abovementioned initial setting equations (Equations 24) into the right side portions of the equations of calculating the pixel values corresponding to the bands (Equations 23) previously described, and calculates new values of a1, b2, c3, and d4. Moreover, the signal processing section 105 substitutes the calculated values into the right side portions of the equations of calculating the pixel values corresponding to the bands (Equations 23), and calculates new values of a1, b2, c3, and d4. This iterative calculation is executed repeatedly.

As already described with reference to FIG. 12, by executing the iterative calculation using the abovementioned equations of calculating the pixel values corresponding to the bands (Equations 23) repeatedly a plurality of times, the values of a1, b2, c3, and d4 gradually converge.

(Step S104)

In Step S104, the image processing apparatus determines whether or not the pixel values corresponding to the bands (a1, b2, c3, and d4) calculated using the equations of calculating the pixel values corresponding to the bands are convergent.

Note that, to determine whether or not the pixel values (a1, b2, c3, and d4) are convergent by the iterative calculation to which the abovementioned equations of calculating the pixel values corresponding to the bands (Equations 23) are applied, the method of determining that the pixel values (a1, b2, c3, and d4) are convergent in the case, for example, in which every difference between the calculation results of the plurality of pixel values by the n-th iterative calculation and the calculation results thereof by the (n−1)-th iterative calculation immediately prior to the n-th iterative calculation is equal to or smaller than the predetermined threshold, for example, equal to or smaller than 5%, can be applied, as described above.

Alternatively, the number of times of executing the iterative calculation may be set to a specified number of times such as six or seven in advance and the signal processing section 105 may determine that pixel values (a1, b2, c3, and d4) are convergent at the timing of end of the specified number of times of the iterative calculation.

In a case of determining in Step S104 that the pixel values (a1, b2, c3, and d4) corresponding to the bands are not convergent, the signal processing section 105 returns to Step S103 to repeat the iterative calculation. On the other hand, in a case of determining in Step S104 that the pixel values (a1, b2, c3, and d4) corresponding to the bands are convergent, the signal processing section 105 goes to Step S105.

(Step S105)

In the case of determining in Step S104 that the pixel values (a1, b2, c3, and d4) corresponding to the bands are convergent, the signal processing section 105 goes to Step S105.

In Step S105, the signal processing section 105 of the image processing apparatus sets the convergent pixel values (a1, b1, c3, and d4) corresponding to the bands as the pixel values of the pixels to be processed.

(Step S106)

Next, in Step S106, the signal processing section 105 of the image processing apparatus determines whether or not calculation of the pixel values (a1, b2, c3, and d4) corresponding to the bands is completed for all the pixels on the image pickup device.

In a case of presence of a pixel for which calculation of the pixel values (a1, b2, c3, and d4) corresponding to the bands is not completed, the signal processing section 105 returns to Step S102 and executes processes from Steps S102 to S105 for the unprocessed pixel.

In a case of determining that calculation of the pixel values (a1, b2, c3, and d4) corresponding to the bands is completed for all the pixels, the image processing section 105 goes to Step S107.

(Step S107)

In a case in which calculation of the pixel values (a1, b2, c3, and d4) corresponding to the bands is completed for all the pixels, the image processing section 150 of the image processing apparatus executes a subsequent signal process, using the pixel values (a1, b2, c3, and d4) corresponding to the bands, which are calculated by the iterative calculation using the equations of calculating the pixel values corresponding to the bands, in Step S107.

The subsequent signal process includes, for example, the generation of the color image, and the analysis of the color component of the subject, which is specifically a process of calculating the vegetation activity index value: NDVI.

Note that, while it has been described above on the assumption that the process of calculating the pixel values (a1, b2, c3, and d4) corresponding to the bands by the iterative calculation using the equations of calculating the pixel values corresponding to the bands is executed per pixel, the calculation process may be executed per predetermined pixel block as described above.

Furthermore, it has been described that the signal processing section 105 "determines whether or not calculation of the pixel values (a1, b2, c3, and d4) corresponding to the bands is completed for all the pixels on the image pickup device" in Step S106 and then "executes a subsequent signal process, using the pixel values (a1, b2, c3, and d4) corresponding to the bands, which are calculated by the iterative calculation using the equations of calculating the pixel values corresponding to the bands, in Step S107." Alternatively, the signal processing section 105 can subsequently perform the process in Step S107 after the "calculation of the pixel values (a1, b2, c3, and d4) corresponding to the bands is completed" per pixel, and can perform determination on whether or not calculation of the pixel values (a1, b2, c3, and d4) corresponding to the bands is completed for all the pixels on the image pickup device in Step S106 after Step S107.

As described with reference to the flow, the image processing apparatus according to the embodiment of the present disclosure, for example, the multispectral camera depicted in FIG. 6 or 9, generates the equations of calculating the pixel values corresponding to the bands to calculate the true pixel values (a1, b1, c3, and d4) corresponding to the bands (wavelengths), using the raw image base pixel values (Araw to Draw) set per pixel on the basis of the pixel values of the raw image captured via the multi-band pass filter and the color filter and the spectral characteristic parameters (Kan to Kdn) of the camera, and calculates true pixel values (a1, b1, c3, and d4) corresponding to the bands by the iterative calculation using the equations of calculating the pixel values corresponding to the bands.

Note that, as a scheme of the iterative calculation using the equations of calculating the pixel values corresponding to the bands, there are a plurality of different schemes.

Two schemes of the iterative calculation will be described with reference to FIGS. 14 and 15.

Figure 14:
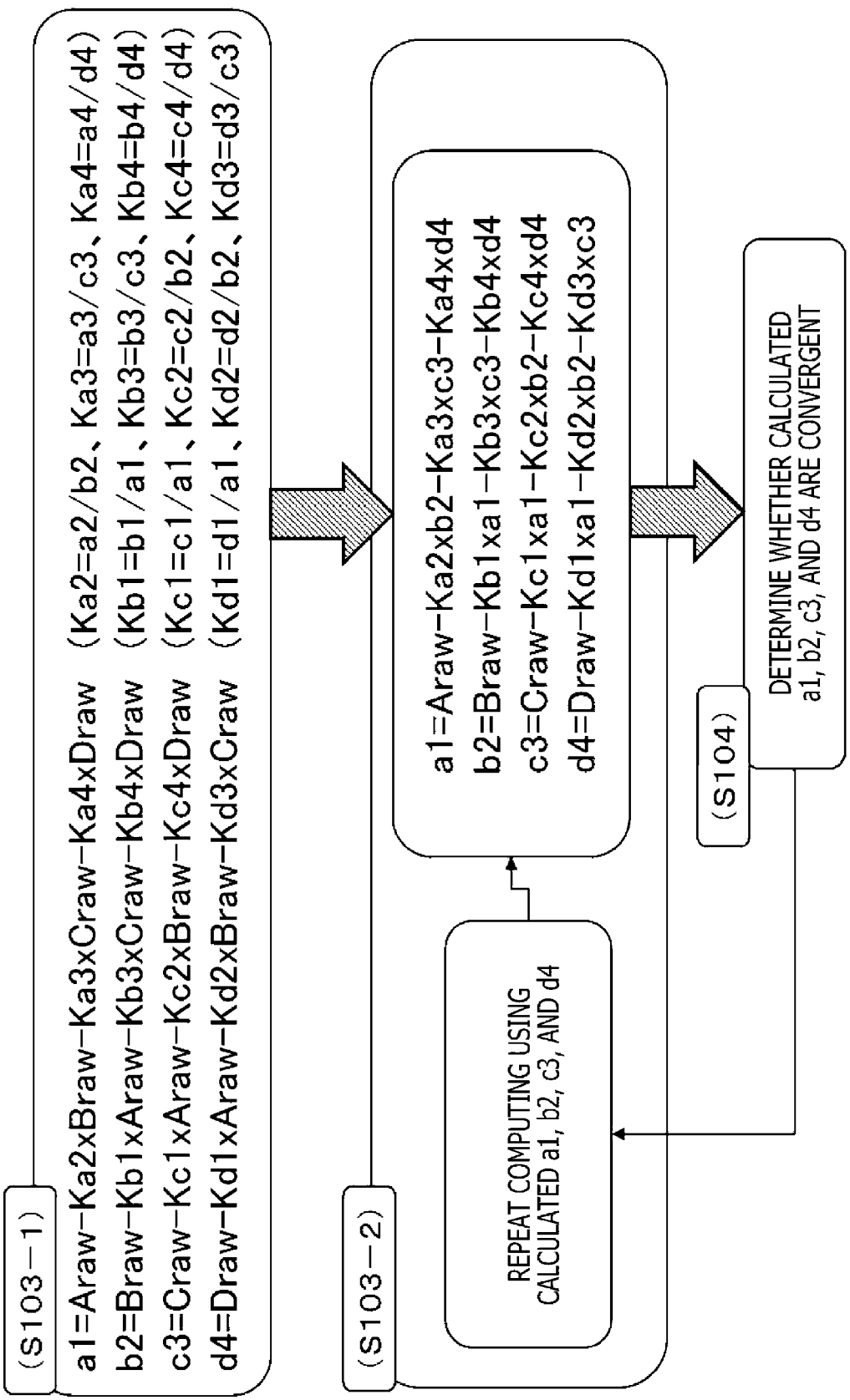
FIG. 14 is an explanatory diagram of an iterative calculation scheme using the equation of calculating the pixel value corresponding to the band.

FIG. 14 depicts similar processes to those described in accordance with the flow depicted in FIG. 13 mentioned above.

FIG. 14 is a diagram for explaining in detail the iterative calculation using the equations of calculating the pixel values corresponding to the bands that is executed in Step S103 depicted in FIG. 13.

In Step S103-1, the raw image base pixel values (Araw to Draw) are input as initial values of a1, b2, c3, and d4 in the right side portions of the equations of calculating the pixel values corresponding to the bands (Equations 23) described previously, and the following initial setting equations (Equations 24) of the equations of calculating the pixel values corresponding to the bands are generated.

$a1 = \text{Araw} - Ka2 \times \text{Braw} - Ka3 \times \text{Craw} - Ka4 \times \text{Draw}$ $b2 = \text{Braw} - Kb1 \times \text{Araw} - Kb3 \times \text{Craw} - Kb4 \times \text{Draw}$ $c3 = \text{Craw} - Kc1 \times \text{Araw} - Kc2 \times \text{Braw} - Kc4 \times \text{Draw}$ $d4 = \text{Draw} - Kd1 \times \text{Araw} - Kd2 \times \text{Braw} - Kd3 \times \text{Craw}$  (Equations 24)

The signal processing section 105 next substitutes a1, b2, c3, and d4 calculated in accordance with the abovementioned initial setting equations (Equations 24) into the right side portions of the equations of calculating the pixel values corresponding to the bands (Equations 23), that is, into the right side portions of the following equations.

$a1 = \text{Araw} - Ka2 \times b2 - Ka3 \times c3 - Ka4 \times d4$ $b2 = \text{Braw} - Kb1 \times a1 - Kb3 \times c3 - Kb4 \times d4$ $c3 = \text{Craw} - Kc1 \times a1 - Kc2 \times b2 - Kc4 \times d4$ $d4 = \text{Draw} - Kd1 \times a1 - Kd2 \times b2 - Kd3 \times c3$  (Equations 23)

The signal processing section 105 substitutes the calculated values into the right side portions of the abovementioned equations of calculating the pixel values corresponding to the bands (Equations 23), and calculates new values of a1, b2, c3, and d4. The signal processing section 105 further substitutes the calculated values into the right side portions of the equations of calculating the pixel values corresponding to the bands (Equations 23), and calculates new values of a1, b2, c3, and d4. The signal processing section 105 executes this iterative calculation repeatedly.

By executing the iterative calculation using the abovementioned equations of calculating the pixel values corresponding to the bands (Equations 23) repeatedly a plurality of times, the values of a1, b2, c3, and d4 gradually converge.

The scheme different from such a processing scheme of the iterative calculation will be described with reference to FIG. 15.

Figure 15:
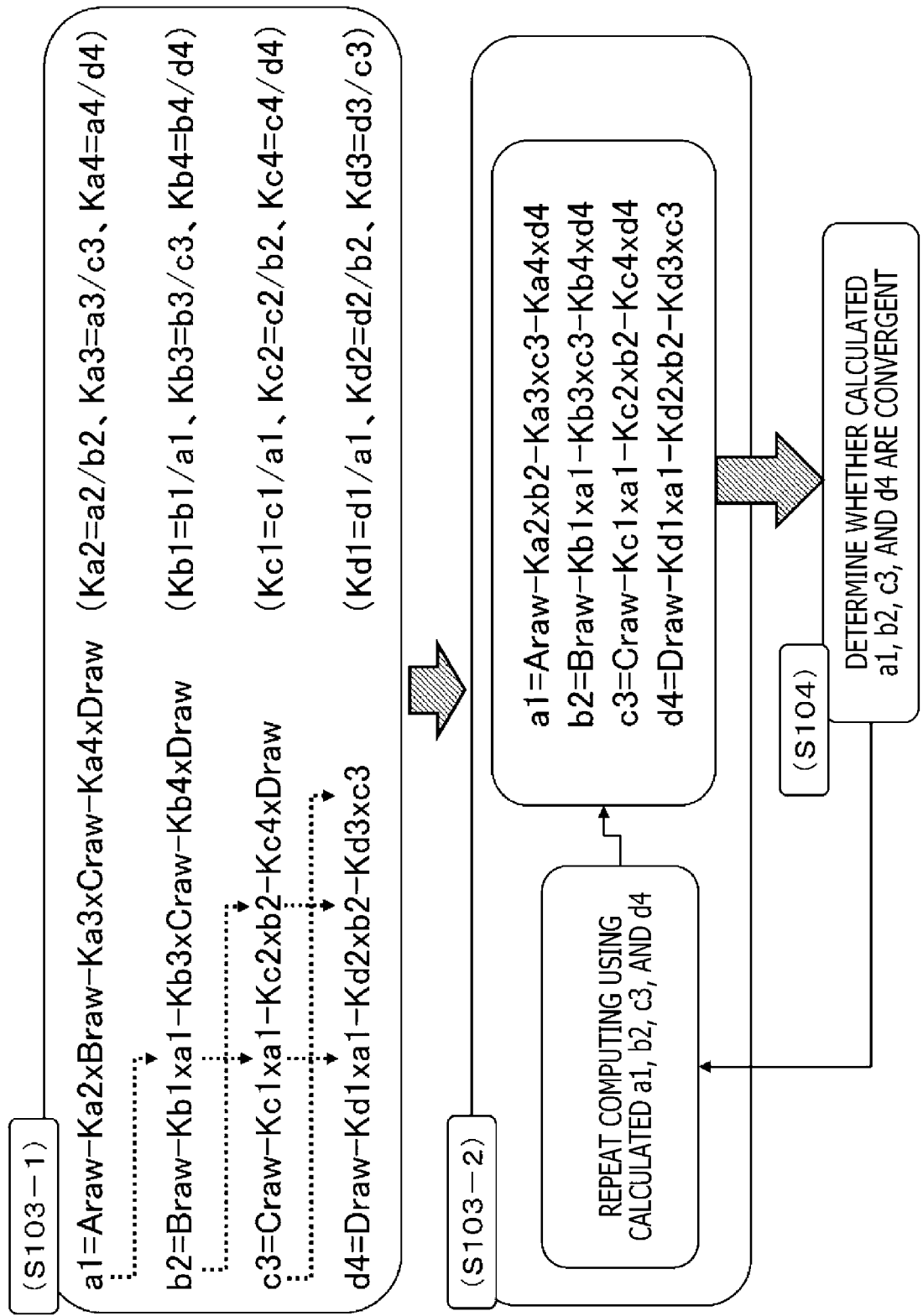
FIG. 15 is an explanatory diagram of the iterative calculation scheme using the equation of calculating the pixel value corresponding to the band.

Similarly to FIG. 14, FIG. 15 is a diagram for explaining in detail the iterative calculation using the equations of calculating the pixel values corresponding to the bands executable in Step S103 depicted in FIG. 13.

In Step S103-1 depicted in FIG. 15, the signal processing section 105 first calculates a1 using the following equation (Equation 24-1) in the initial setting equations (Equations 24) of the abovementioned equations of calculating the pixel values corresponding to the bands.

$a1 = \text{Araw} - Ka2 \times \text{Braw} - Ka3 \times \text{Craw} - Ka4 \times \text{Draw}$  (Equation 24-a)

Next, Araw in the equation of calculating b2 in the initial setting equations (Equations 24) of the equations of calculating the pixel values corresponding to the bands, that is, $b2 = \text{Braw} - Kb1 \times \text{Araw} - Kb3 \times \text{Craw} - Kb4 \times \text{Draw}$  (Equation 24-2)

is replaced by a1 calculated using (Equation 24-1) as expressed by the following Equation 24-3.

$b2 = \text{Braw} - Kb1 \times a1 - Kb3 \times \text{Craw} - Kb4 \times \text{Draw}$  (Equation 24-3)

Using (Equation 24-3), b2 is calculated.

Next, Araw and Braw in the equation of calculating c3 in the initial setting equations (Equations 24) of the equations of calculating the pixel values corresponding to the bands, that is, $c3 = \text{Craw} - Kc1 \times \text{Araw} - Kc2 \times \text{Braw} - Kc4 \times \text{Draw}$  (Equation 24-4)

are replaced by a1 and b2 calculated by (Equation 24-1) and (Equation 24-3), as expressed by the following Equation 24-5.

$c3 = \text{Craw} - Kc1 \times a1 - Kc2 \times b2 - Kc4 \times \text{Draw}$  (Equation 24-5)

Using the equation (Equation 24-5), c3 is calculated.

Next, Araw, Braw, and Craw in the equation of calculating d4 (Equation 24-6) in the initial setting equations (Equations 24) of the equations of calculating the pixel values corresponding to the bands, that is, $$d4 = Draw - Kd1 \times Araw - Kd2 \times Braw - Kd3 \times Craw \quad \text{(Equation 24-6)}$$

are replaced by a1, b2, and c2 calculated by (Equation 24-1), (Equation 24-3), and (Equation 24-5), as expressed by the following Equation 24-7.

$$d4 = Draw - Kd1 \times Aa1 - Kd2 \times b2 - Kd3 \times c3 \quad \text{(Equation 24-7)}$$

Using (Equation 24-7), d4 is calculated.

Next, in Step S103-2, a1, b2, c3, and d4 calculated in Step S103-1 mentioned above are substituted into the right side portions of the equations of calculating the pixel values corresponding to the bands (Equations 23).

$$a1 = Araw - Ka2 \times b2 - Ka3 \times c3 - Ka4 \times d4$$

$$b2 = Braw - Kb1 \times a1 - Kb3 \times c3 - Kb4 \times d4$$

$$c3 = Craw - Kc1 \times a1 - Kc2 \times b2 - Kc4 \times d4$$

$$d4 = Draw - Kd1 \times a1 - Kd2 \times b2 - Kd3 \times c3 \quad \text{(Equations 23)}$$

The signal processing section 105 substitutes the calculated values into the right side portions of the abovementioned equations of calculating the pixel values corresponding to the bands (Equations 23), and calculates new values of a1, b2, c3, and d4. The signal processing section 105 further substitutes the calculated values into the right side portions of the equations of calculating the pixel values corresponding to the bands (Equations 23), and calculates new values of a1, b2, c3, and d4. This iterative calculation is executed repeatedly.

By executing the iterative calculation using the abovementioned equations of calculating the pixel values corresponding to the bands (Equations 23) repeatedly a plurality of times, the values of a1, b2, c3, and d4 gradually converge.

In the scheme depicted in FIG. 15, a process of substituting the value calculated using one of the plural equations that configure the initial setting equations (Equations 24) of the equations of calculating the pixel values corresponding to the bands into the other equations in the initial setting equations is executed. Performing such a process makes it possible to achieve earlier convergence and to decrease the number of times of computing.

[4. Difference between processes according to embodiment of present disclosure and matrix applied processes]

Next, a difference between processes according to the embodiment of the present disclosure and matrix applied processes will be described.

As already described with reference to FIGS. 3A and 3B and the like, for example, in a case of calculating the pixel values corresponding to the bands using the pixel values of the raw image, a process to which the matrix as expressed by (Equation 11) described above is applied is known.

By contrast, in the processes according to the embodiment of the present disclosure, the pixel values corresponding to the bands are calculated by generating (Equations 23) previously described, that is, the equations of calculating the pixel values according to the bands, and performing the iterative calculation without applying the matrix.

The difference due to the difference in processes and superiority of the processes according to the embodiment of the present disclosure will hereinafter be described.

Figure 16:
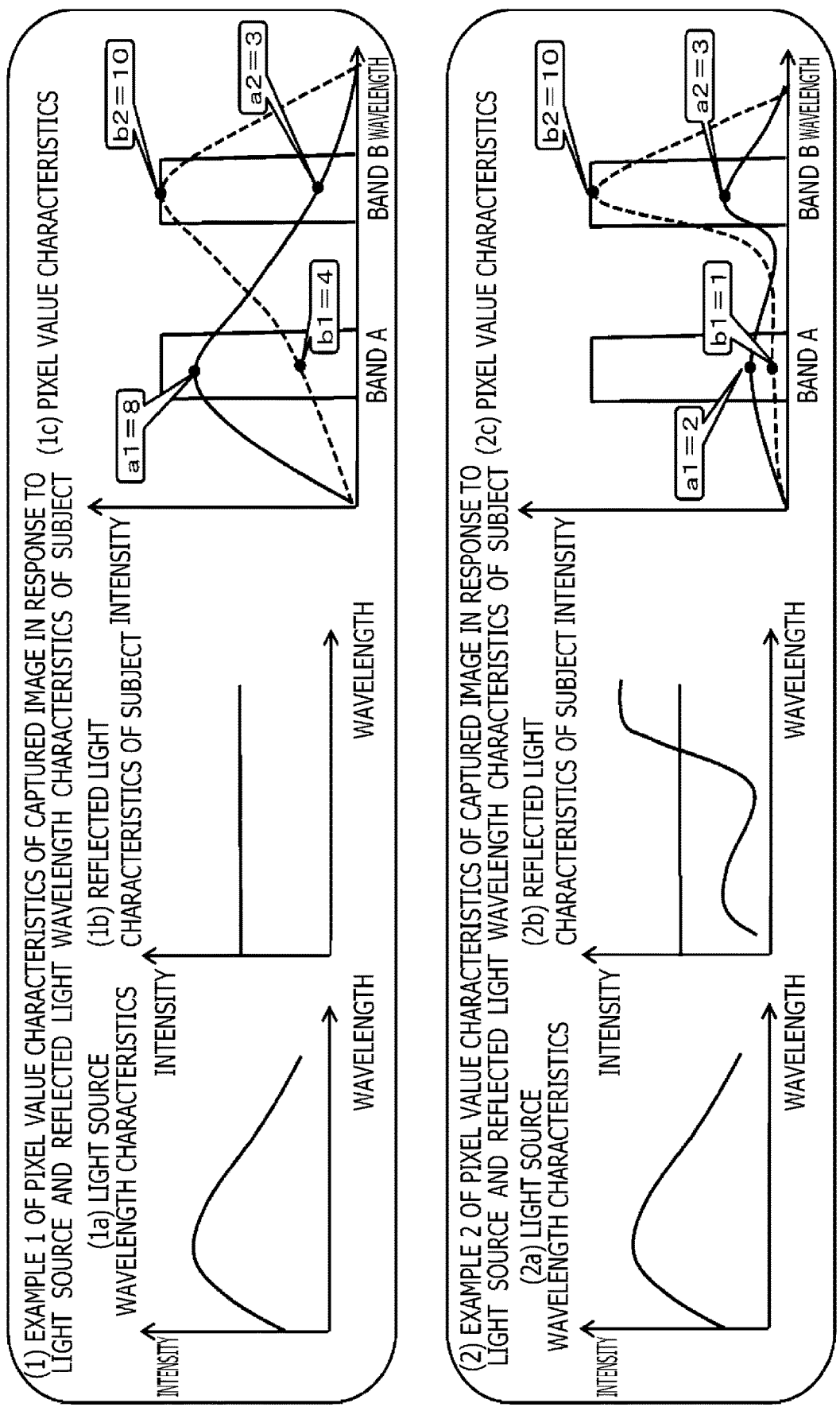
FIG. 16 illustrates explanatory diagrams of pixel value characteristics in a case of capturing images of a subject having two different reflection characteristics by the same multispectral camera.

FIG. 16 illustrates explanatory diagrams of pixel value characteristics in a case of capturing images of a subject having two different reflection characteristics by the same multispectral camera.

FIGS. 16(1) and 16(2) depict (1*c*) and (2*c*) pixel value characteristics, that is, pixel value characteristics of the image pickup device (pixel value characteristics of the raw image), in a case of capturing images of a subject having different reflection characteristics depicted in FIGS. 16(1*b*) and 16(2*b*) under a light source identical in wavelength characteristics depicted in FIGS. 16(1*a*) and 16(2*a*).

An example of FIG. 16(1) is an example in a case in which reflection characteristics of the subject are uniform in wavelength.

An example of FIG. 16(2) is an example in a case in which the subject has the characteristics of strong reflection of a long wavelength region and in which an image of a red subject, for example, is captured.

It is noted that in the present example, the dual-band pass filter that transmits light in the bands A and B is used as the multi-band pass filter.

In the pixel value characteristics depicted in FIGS. 16(1*c*) and 16(2*c*), pixel value distributions of the two pixel values Araw and Braw in the raw image are illustrated.

In a case of FIG. 16(1), that is, in a case in which the reflection characteristics of the subject is uniform in wavelength, signal values (intensities) in the bands A and B contained in pixel values of the captured image, that is, the pixel value Araw of the A pixel in the raw image, are as follows:

Signal value a1 in band A=8, and

Signal value a2 in band B=3.

Therefore, the pixel value of Araw is expressed as follows.

$$Araw = a1 + a2 = 8 + 3 = 11$$

Furthermore, signal values (intensities) in the bands A and B contained in pixel value Braw of the B pixel in the raw image are as follows:

Signal value b1 in band A=4, and

Signal value b2 in band B=10.

Therefore, the pixel value of Braw is expressed as follows.

$$Braw = b1 + b2 = 4 + 10 = 14$$

Here, in a case of calculating the pixel values (a1 and b2) corresponding to bands from the raw image pixel values (Araw and Braw) by applying the matrix computing, the matrix computing according to the following (Equation 31) may be executed.

[Math. 2]

$$\begin{pmatrix} a1 \\ b2 \end{pmatrix} = \begin{pmatrix} G1 & G2 \\ G3 & G4 \end{pmatrix} \begin{pmatrix} Araw \\ Braw \end{pmatrix} \quad \text{(Equation 31)}$$

In general, coefficients (G1, G2, G3, and G4) of a matrix are set in such a manner that accurate pixel values (a1 and a2) corresponding to the bands in a case in which the reflection characteristics of the subject are flat as depicted in FIG. 16(1*b*).

Therefore, in the case depicted in FIGS. 16(1), a1=8 and b2=10 are calculated by the matrix computing depicted in (Equation 31) above, and high precision true pixel values (a1 and b2) corresponding to the bands can be calculated.

However, in a case in which the reflection characteristics of the subject are not flat and setting is made as depicted in FIG. 16(2b), the signal values (intensities) in the bands A and B contained in the pixel value Araw of the A pixel in the raw image are as follows.

Signal value a1 in band A=2, and
Signal value a2 in band B=3.
Therefore, the pixel value of Araw is expressed as follows.

Araw=a1+a2=2+3=5

Furthermore, signal values (intensities) in the bands A and B contained in pixel value Braw of the B pixel in the raw image are as follows:

Signal value b1 in band A=1, and
Signal value b2 in band B=10.
Therefore, the pixel value of Braw is expressed as follows.

Braw=b1+b2=1+10=11

In this case, in a case of performing the matrix computing to which a matrix having the same matrix elements (G1 to G4) as the matrix applied in the example depicted in FIG. 16(1) is applied, the following values are calculated as the pixel value (a1 and b2) corresponding to the bands.

a1=2.6, and
b2=9.5.

These values greatly differ from the actual pixel values (a1 and b2) corresponding to the bands depicted in FIG. 16(1c), that is, a1=2, and
b2=10.

In such way, in the case of calculating the pixel values (a1 and b2) corresponding to the bands while the matrix is applied to the calculation, there are cases where it may be impossible to calculate correct values depending on the reflection characteristics of the subject and the characteristics of the light source.

By contrast, in the processes according to the embodiment of the present disclosure, the pixel values corresponding to the bands are calculated by generating (Equations 23) previously described, that is, the equations of calculating the pixel values according to the bands, and performing the iterative calculation without applying the matrix.

In other words, the iterative calculation is executed using the following equations of calculating the pixel values corresponding to the bands (Equations 23).

$a1 = Araw - Ka2 \times b2 - Ka3 \times c3 - Ka4 \times d4$ $b2 = Braw - Kb1 \times a1 - Kb3 \times c3 - Kb4 \times d4$ $c3 = Craw - Kc1 \times a1 - Kc2 \times b2 - Kc4 \times d4$ $d4 = Draw - Kd1 \times a1 - Kd2 \times b2 - Kd3 \times c3$ (Equations 23)

By executing the iterative calculation using the abovementioned equations of calculating the pixel values corresponding to the bands (Equations 23) repeatedly a plurality of times, the values of a1, b2, c3, and d4 gradually converge as already described with reference to FIG. 12.

Performing the processes makes it possible to accurately calculate the pixel values (a1 and b2) corresponding to the bands in any of the cases of FIGS. 16(1) and 16(2).

The reason for this is as follows. The parameters (Kan to Kdn) contained in the abovementioned equations of calculating the pixel values corresponding to the bands (Equations 23) applied in the processes according to the embodiment of the present disclosure are camera-unique spectral characteristic parameters, do not depend on the subject and the light source to be used, and are unchangeable even with changes in the light source to be used and reflected light characteristics of the subject.

For example, as already described with reference to FIG. 10, ka2=a2/b2 is the ratio (a2/b2) of the transmitted signal a2 by the filter A to the transmitted signal b2 by the filter B in the band B region in the graphs depicted in FIG. 10.

Furthermore, Ka3=a3/c3 is the ratio (a3/c3) of the transmitted signal a3 by the filter A to the transmitted signal c2 by the filter C in the band C region in the graphs depicted in FIG. 10.

These are the camera-unique spectral characteristic parameters and do not change at all even with the changes in the subject and the light source to be used.

Therefore, the abovementioned equations of calculating the pixel values corresponding to the bands (Equations 23) are equations commonly used no matter what type of light source and subject are used, and it is possible to accurately calculate the high precision pixel values (a1, b2, and the like) corresponding to the bands even with the changes in the light source and the subject.

5. Specific Example of Using Image Processing Apparatus According to Embodiment of Present Disclosure A specific example of using the image processing apparatus according to the embodiment of the present disclosure will next be described.

The image processing apparatus according to the embodiment of the present disclosure which is, for example, the multispectral camera 100 having the configuration depicted in FIG. 6 or 9, can calculate the high precision values of the signals (R, NIR, and the like) in the specific wavelength band on the basis of the raw image pixel values (Rraw and the like) of the pixels input to the image pickup device (image sensor) via the multi-band pass filter (MBP) and the color filter.

As a result of this process, it is possible to generate and output, for example, a color image such as a noise-free high precision RGB image.

Further, it is also possible to perform high precision analysis of the color components of the subject. For example, it is possible to precisely calculate the vegetation activity index value such as the NDVI (Normalized Difference Vegetation Index) that is the index value of the activity of vegetation as described above.

Figure 17:
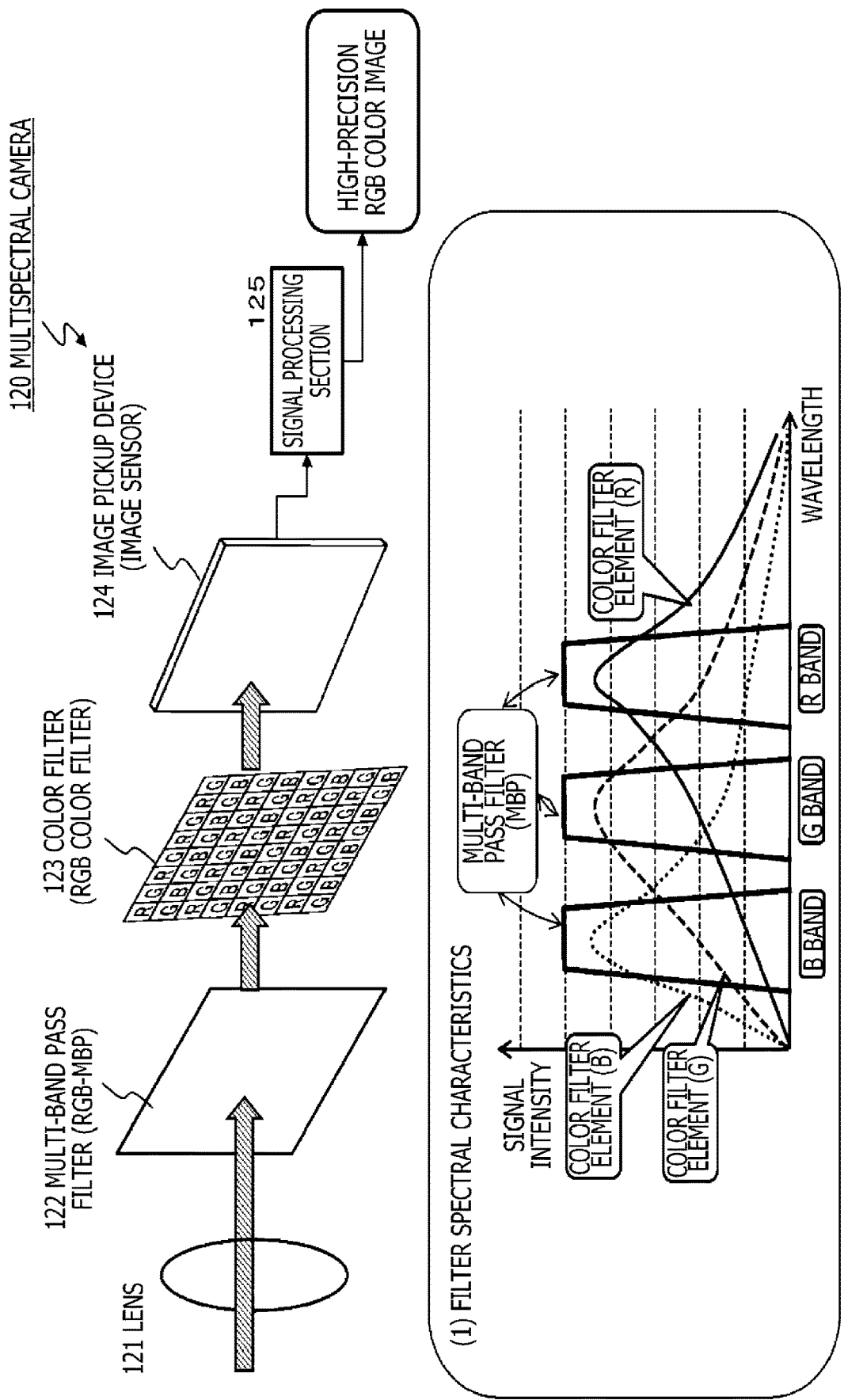
FIG. 17 is a diagram depicting an example of a configuration of a multispectral camera as an image processing apparatus in a case of generating and outputting a color image such as a noise-free high precision RGB image.

FIG. 17 is a diagram depicting an example of a configuration of a multispectral camera 120 as the image processing apparatus in a case of generating and outputting a color image such as a noise-free high precision RGB image.

In the multispectral camera 120 depicted in FIG. 17, photographic light of the subject input via a lens 121 is input to an image pickup device (image sensor) 124 via a multi-band pass filter (RGB-MBP) 122 and a color filter (RGB color filter) 123.

An image captured by the image pickup device (image sensor) 124 is input to a signal processing section 125.

The signal processing section 125 generates equations of calculating pixel values corresponding to RGB bands, which correspond to the previously described equations of calculating pixel values corresponding to bands (Equations 23), using the raw image base pixel values (Raw, Graw, and Braw) from a raw image output from the image pickup device (image sensor) 124 and the spectral characteristic parameters of the multispectral camera 120, and executes iterative calculation.

The signal processing section 125 executes the iterative calculation of equations of calculating the pixel values corresponding to the RGB bands per pixel, and calculates RGB pixel values obtained as convergence values as the pixel values of the RGB pixel values. The RGB pixel values are noise-reduced high precision pixel values and a high precision RGB color image is generated and output using the pixel values.

Graphs depicted in "(1) Filter spectral characteristics" of FIG. 17 indicate spectral characteristics of the multi-band pass filter (RGB-MBP) 122 and the color filter (RGB color filter) 123. While the color filter (RGB color filter) 123 is the RGB color filter, the color filter (RGB color filter) 123 causes light of noise components to pass therethrough.

The multi-band pass filter (RGB-MBP) 122 used in the present embodiment is a filter that transmits light in the three bands which are the R band, the G band, and the B band.

An image captured using a combination of the multi-band pass filter (RGB-MBP) 122 and the color filter (RGB color filter) 123 having these spectral characteristics is input to the signal processing section 125.

The signal processing section 125 can calculate noise-reduced high precision RGB pixel values by generating the equations of calculating pixel values corresponding to the RGB bands, which correspond to the previously described equations of calculating the pixel values corresponding to the bands (Equations 23), on the basis of the raw image input from the image pickup device 124, and performing the iterative calculation.

Figure 18:
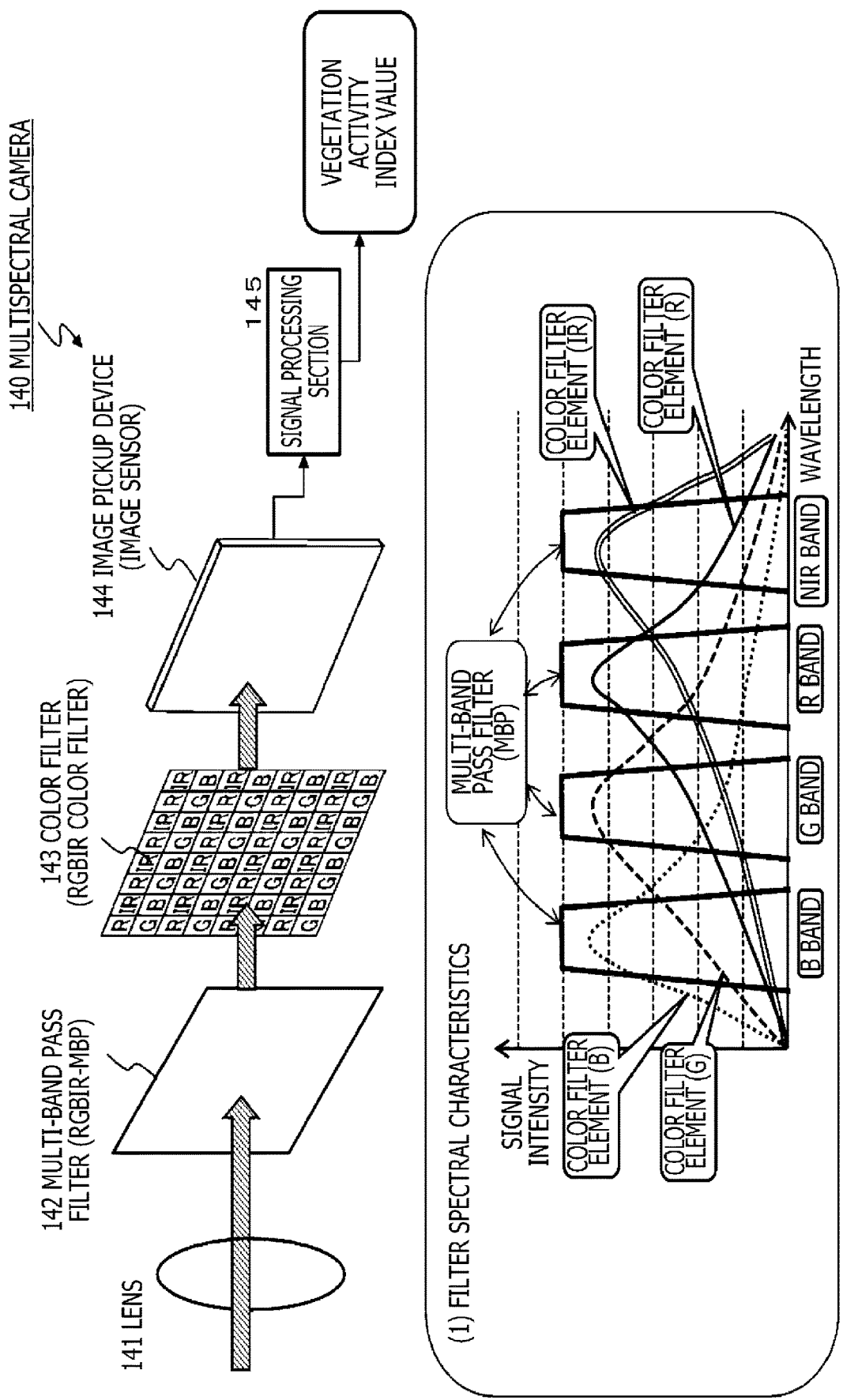
FIG. 18 is a diagram depicting an example of a configuration of a multispectral camera as an image processing apparatus that executes a high precision analysis process on color components of a subject.

FIG. 18 is a diagram depicting an example of a configuration of a multispectral camera 140 as the image processing apparatus that executes a high precision analysis process on the color components of the subject.

The multispectral camera 140 depicted in FIG. 18 can precisely calculate the vegetation activity index value such as the NDVI (Normalized Difference Vegetation Index).

In the multispectral camera 140 depicted in FIG. 18, photographic light of the subject input via a lens 141 is input to an image pickup device (image sensor) 144 via a multi-band pass filter (RGBIR-MBP) 142 and a color filter (RGBIR color filter) 143.

An image captured by the image pickup device (image sensor) 144 is input to a signal processing section 145.

The signal processing section 145 generates equations of calculating pixel values corresponding to RGBIR bands, which correspond to the previously described equations of calculating pixel values corresponding to bands (Equations 23), using the raw image base pixel values (Raw, Graw, Braw, and IRraw) from a raw image output from the image pickup device (image sensor) 144 and the spectral characteristic parameters of the multispectral camera 120, and executes iterative calculation.

The signal processing section 125 executes the iterative calculation of the equations of calculating the pixel values corresponding to the RGB bands per pixel, and calculates a vegetation activity index value such as the NDVI using RGB pixel values obtained as convergence values. The RGBIR pixel values obtained as the convergence values by executing the iterative calculation of the equations of calculating the pixel values corresponding to the RGBIR bands are noise-reduced high precision pixel values, and it is possible to calculate a high precision vegetation activity index value such as the NDVI by using the pixel values.

Graphs depicted in "(1) Filter spectral characteristics" of FIG. 18 indicate spectral characteristics of the multi-band pass filter (RGBIR-MBP) 142 and the color filter (RGBIR color filter) 143. While the color filter (RGBIR color filter) 143 is the RGBIR color filter, the color filter (RGBIR color filter) 123 causes light of noise components to pass therethrough.

The multi-band pass filter (RGBIR-MBP) 142 used in the present embodiment is a filter that transmits light in the four bands which are the R band, the G band, the B band, and the NIR band.

An image captured using a combination of the multi-band pass filter (RGBIR-MBP) 142 and the color filter (RGBIR color filter) 143 having these spectral characteristics is input to the signal processing section 145.

The signal processing section 145 can calculate noise-reduced high precision RGB pixel values by generating the equations of calculating pixel values corresponding to the RGBIR bands, which correspond to the previously described equations of calculating the pixel values corresponding to the bands (Equations 23), on the basis of the raw image input from the image pickup device 144, and performing the iterative calculation.

The signal processing section calculates an activity index value, for example, an NDVI value, of vegetation that is the subject, using the high precision RGBIR pixel values.

As described above, the NDVI can be calculated in accordance with the following equation.

$$NDVI=(NIR-RED)/(NIR+RED)$$

In the above equation,

RED and NIR are intensities (pixel values) of a RED wavelength and a NIR wavelength in each pixel of the image.

Figure 19:
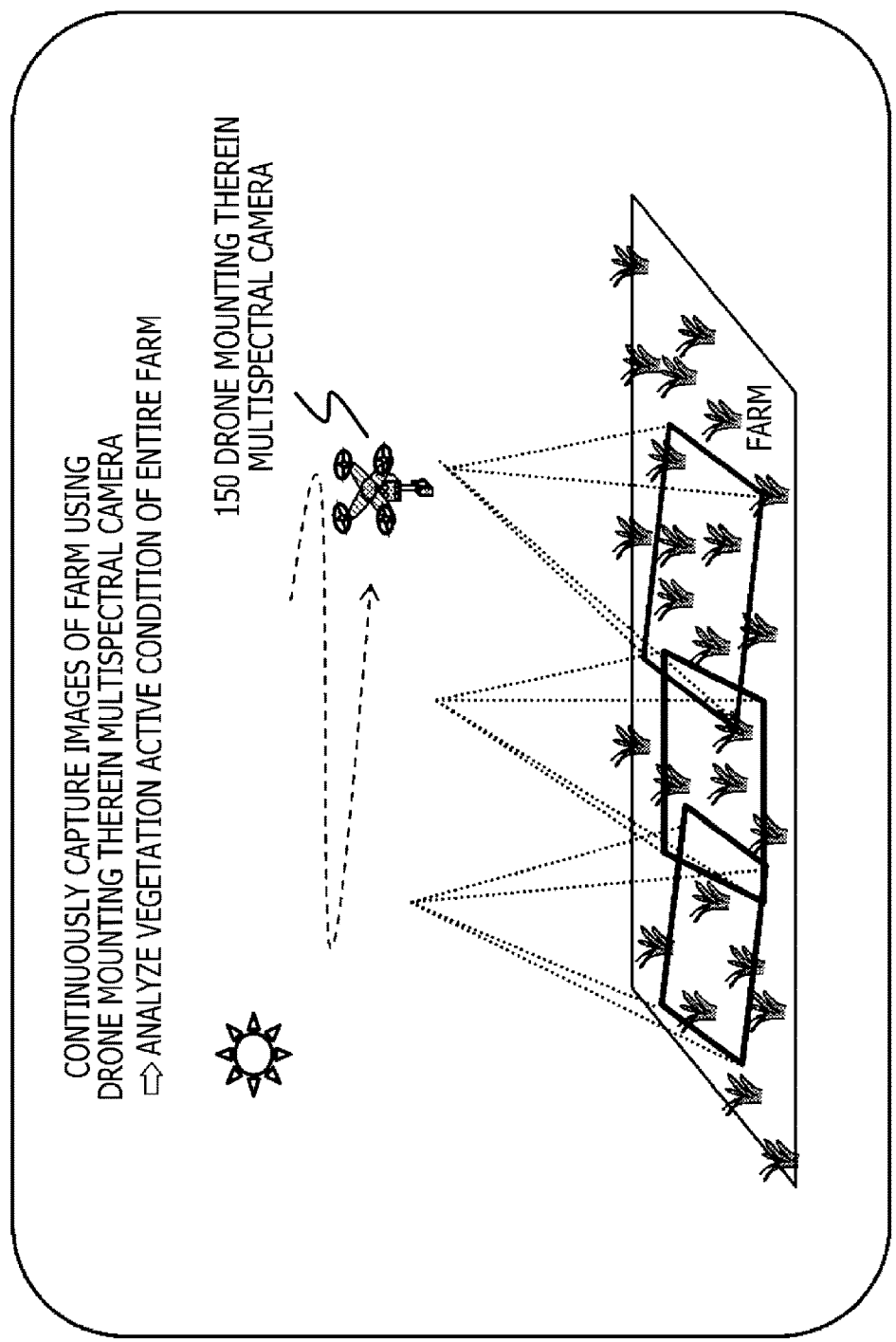
FIG. 19 is an explanatory diagram of a specific example of image capturing for analyzing a plant active state.

A specific example of image capturing will be described with reference to FIG. 19. For example, as depicted in FIG. 19, a process of capturing an image of an entire farm using a drone 150 mounting therein a multispectral camera that simultaneously captures images of the RED wavelength and the NIR wavelength, and analyzing a vegetation active state is performed.

Note that, while the NDVI is most frequently used as the index value of the activity of vegetation, GNDVI using Green as an alternative to RED or VARI configured with RGB signals is also used. GNDVI and VARI are each expressed by the following equations by way of example. (Various indexes are proposed and different equations are sometimes used for the same name.)

$$GNDVI=(NIR-GRN)/(NIR+GRN)$$

$$VARI=(GRN-RED)/(GRN+RED-BLU)$$

Figure 20:
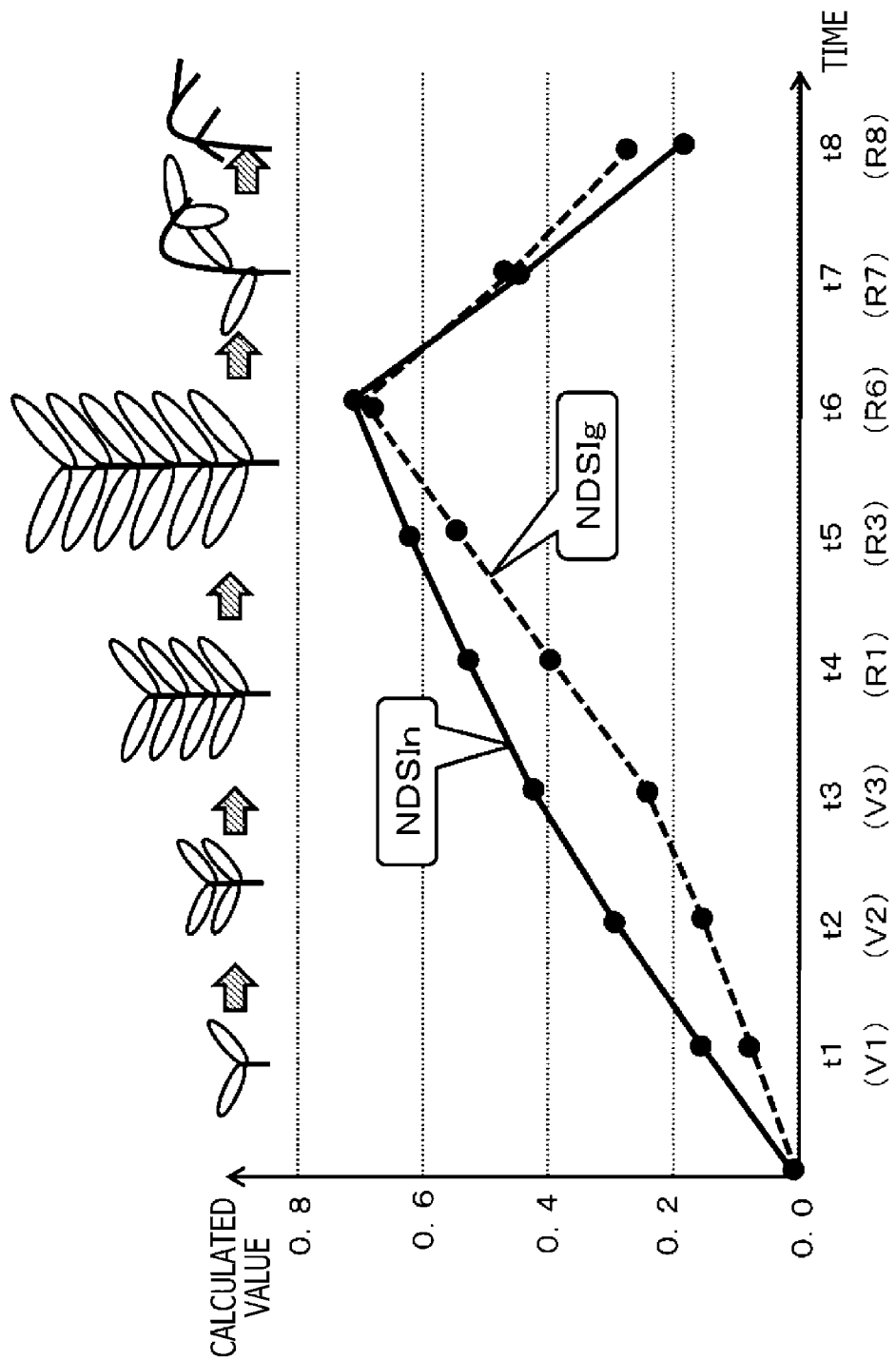
FIG. 20 is an explanatory diagram of vegetation activity index values.

As depicted in graphs of FIG. 20, these two vegetation activity index values vary according to a vegetation growth situation. In initial periods of growth (V1 to V3), it is possible to better grasp a vegetation state change using the NDVI, and in last periods of growth (R3 to R6), it is easier to grasp the vegetation state change using either the GNDVI or the VARI; thus, it is preferable to use any of the index values according to the growth period of the vegetation.

As depicted in graphs of FIG. 20, these two vegetation activity index values vary according to a vegetation growth situation. In the initial periods of growth (V1 to V3), it is possible to better grasp the vegetation state change using an NDSIn, and in the last periods of growth (R3 to R6), it is easier to grasp the vegetation state change using an NDSIg; thus, it is preferable to use any of the index values according to the growth period of the vegetation.

Note that, as depicted in FIG. 19, in a case of performing a process of capturing the image of the entire farm using the drone 150 mounting therein the multispectral camera that simultaneously captures images of the RED wavelength and the NIR wavelength, and analyzing the vegetation active state, the camera captures a plurality of images of regions into which the entire farm is divided.

In such a case, performing a process of combining (stitching) the images makes it possible to generate a combined image of a vast region. It is to be noted, however, that in the case of performing such stitching of the images, it is necessary to make correction or the like to resolve an image difference since the captured images differ in luminance as described above. In a case of performing Band extraction computing, it is convenient to perform the Band extraction computing before a pixel operation is performed, that is, before a stitching process is performed, for the purpose of improving precision.

Conversely, in a case in which pixel positions are misaligned among raw images to be subjected to the band extraction, considerable precision degradation occurs unless the band extraction computing is performed after alignment. In a case in which the misalignment involves phase compensation, it is appropriate to perform the phase compensation before the band extraction computing is performed.

Moreover, with respect to shading correction or distortion, the shading correction or the distortion often have different characteristics depending on wavelengths; thus, it is appropriate to perform the shading correction or the distortion after the Band extraction computing is performed.

6. Other Embodiments

Other embodiments will next be described. The following two embodiments will be described in sequence.

(1) Example of Configuration of Apparatus Using Micro Lens Array as an Alternative to Color Filter (2) Example of Configuration of Apparatus Using Plasmonic Filter as an Alternative to Color Filter

6-(1) Example of Configuration of Apparatus Using Micro Lens Array as an Alternative to Color Filter First, an example of a configuration of an image processing apparatus using a micro lens array as an alternative to the color filter will be described with reference to FIG. 21.

Figure 21:
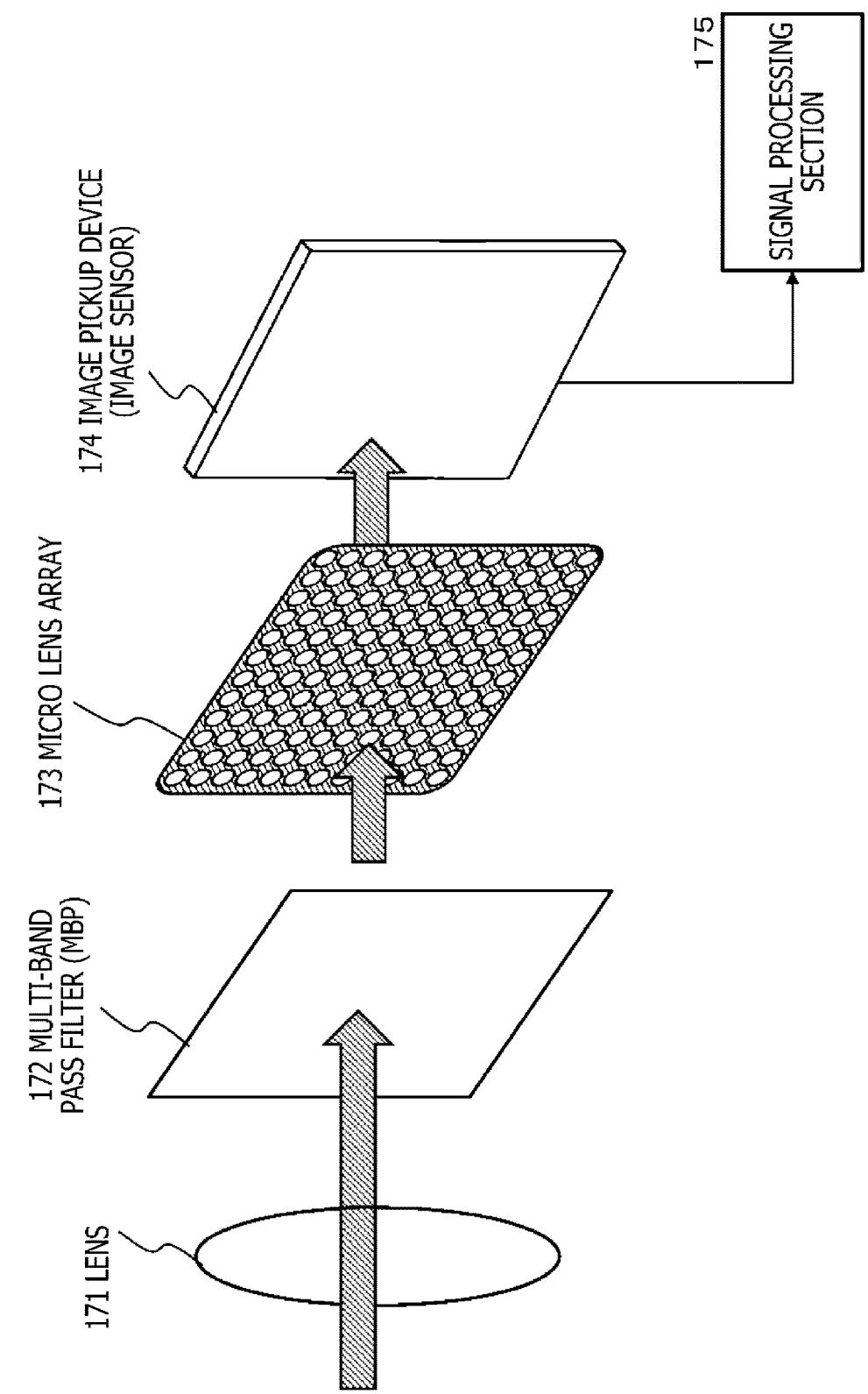
FIG. 21 is an explanatory diagram of an example of a configuration of an image processing apparatus using a micro lens array as an alternative to the color filter.

A multispectral camera 170 depicted in FIG. 21 is configured such that the color filter 103 in the multispectral camera 100 previously described with reference to FIGS. 6 and 9 is replaced by a micro lens array 173.

In the multispectral camera 170 depicted in FIG. 21, photographic light of a subject input via a lens 171 is input to an image pickup device (image sensor) 174 via a multi-band pass filter (MBP) 172 and the micro lens array 173.

Furthermore, raw images are input to a signal processing section 175 from the image pickup device (image sensor) 174 and subjected to a signal process.

As depicted in FIG. 22, the micro lens array (MLA) 173 has a configuration such that many micro lenses are disposed.

As illustrated in a cross-sectional view of FIG. 22(b), light incident via the micro lenses that configure the micro lens array (MLA) 173 is radiated onto the image pickup device 174 and an image is captured.

The light incident on the image pickup device 174 via the micro lenses is subjected to a spectroscopic process in response to a wavelength by the lens. For example, the light is input to different pixels on the image pickup device 174 among bands such as R, G, and B bands. In other words, the micro lens array (MLA) 173 can receive the light in each band such as the R, G, B, or IR band, per pixel, similarly to the color filter.

The multispectral camera using the micro lenses as an alternative to the color filter can be configured in such way, and the multispectral camera using such micro lenses can similarly execute the processes according to the embodiment of the present disclosure.

6-(2) Example of Configuration of Apparatus Using Plasmonic Filter as an Alternative to Color Filter Next, an example of a configuration of an image processing apparatus using a plasmonic filter as an alternative to the color filter will be described with reference to FIG. 23.

A multispectral camera 180 depicted in FIG. 23 has a configuration such that the color filter 103 in the multispectral camera 100 previously described with reference to FIGS. 6 and 9 is replaced by a plasmonic filter 183.

Figure 23:
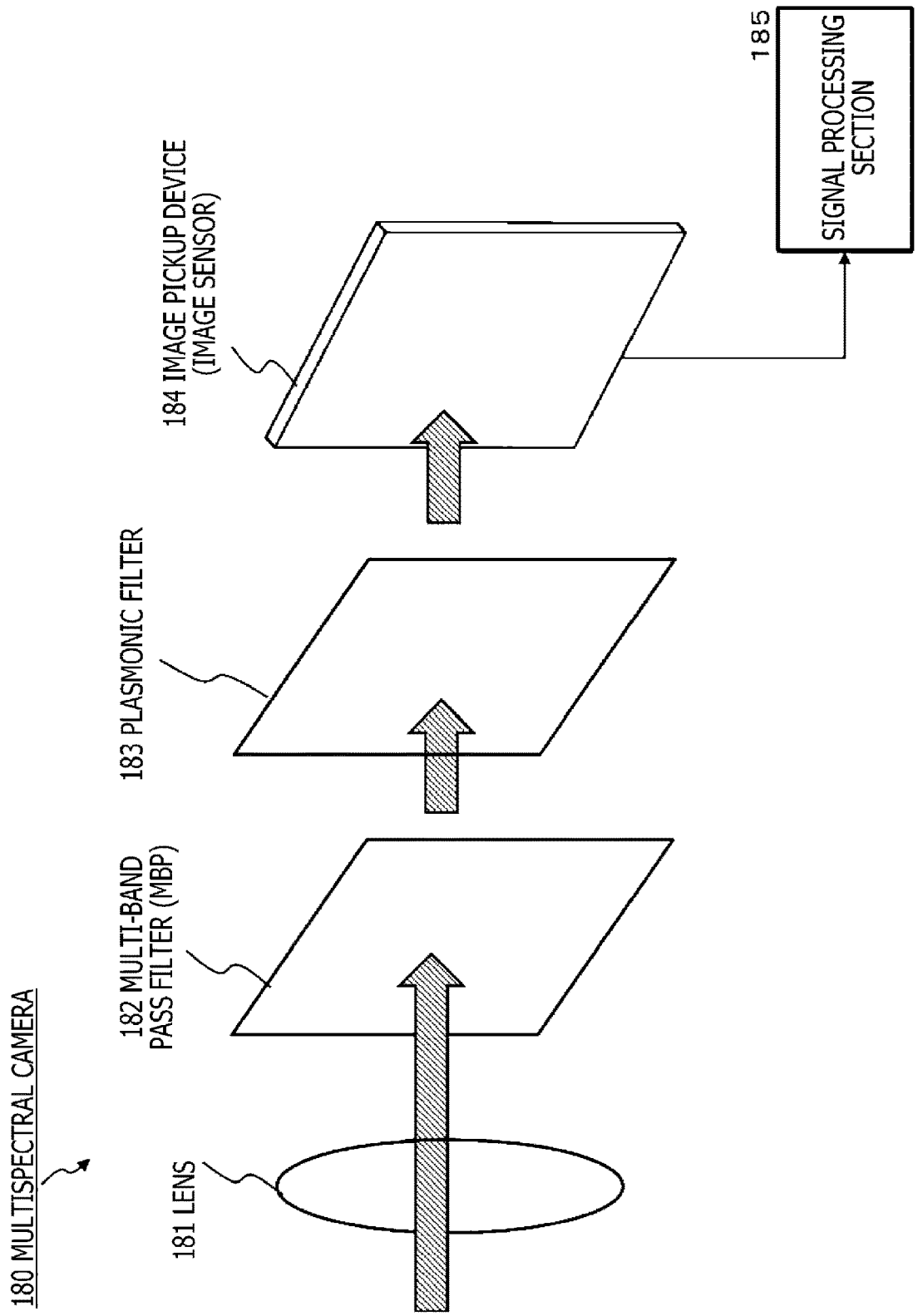
FIG. 23 is an explanatory diagram of an example of a configuration of an image processing apparatus using a plasmonic filter as an alternative to the color filter.

In the multispectral camera 180 depicted in FIG. 23, photographic light of a subject input via a lens 181 is input to an image pickup device (image sensor) 184 via a multi-band pass filter (MBP) 182 and the plasmonic filter 183.

Furthermore, raw images are input to a signal processing section 185 from the image pickup device (image sensor) 184 and subjected to a signal process.

The plasmonic filter 183 is a filter that configures different light passbands by punching a hole per pixel on the image pickup device 184 in such a manner that holes differ in diameter or pitch among pixels. For example, the plasmonic filter 183 can configure a pixel array in different wavelength bands such as eight bands, 12 bands, or 16 bands.

Placing the plasmonic filter 183 in front of the image pickup device (image sensor) 184 and further placing the multi-band pass filter (MBP) 182 in front of the plasmonic filter 183 make it possible to capture raw images configured from pixel values in different wavelength bands such as eight bands, 12 bands, or 16 bands.

The multispectral camera using the plasmonic filter as an alternative to the color filter can be configured in such way, and the multispectral camera using such a plasmonic filter can similarly execute the processes according to the embodiment of the present disclosure.

7. Example of Configurations of Image Processing Apparatus and Image Processing System According to Embodiment of the Present Disclosure Next, an example of configurations of an image processing apparatus and an image processing system according to the embodiment of the present disclosure will be described.

Figure 24:
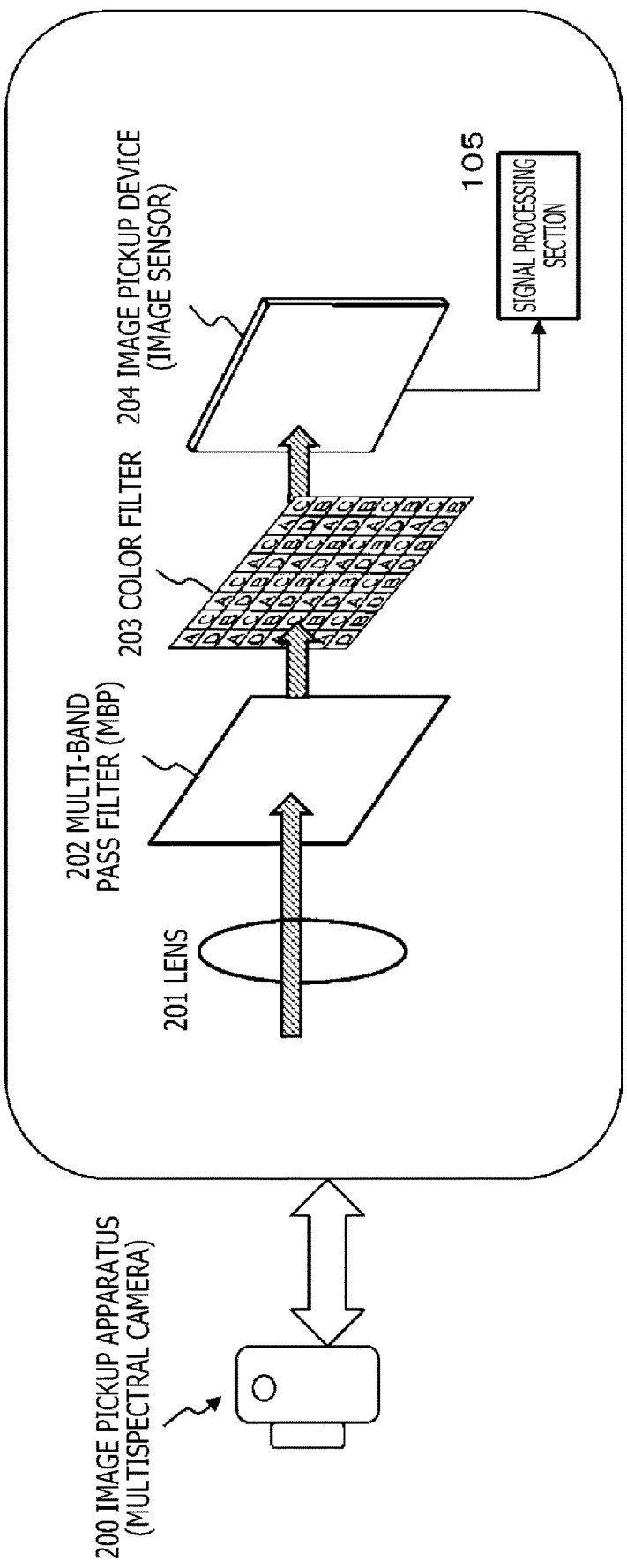
FIG. 24 is an explanatory diagram of an example of a configuration of an image pickup apparatus (multispectral camera) as an example of the image processing apparatus according to an embodiment of the present disclosure.

The image processing apparatus according to the embodiment of the present disclosure is, for example, an image pickup apparatus (multispectral camera) 200 having a configuration depicted in FIG. 24.

Similarly to the multispectral camera already depicted in FIGS. 6 and 9, the image pickup apparatus (multispectral camera) 200 is configured such that photographic light of a subject input via a lens 201 is input to an image pickup device (image sensor) 204 via a multi-band pass filter (MBP) 202 and a color filter (RGBIR color filter) 203.

Furthermore, raw image pixel values (Rraw and the like) are input to the signal processing section 105 from the image pickup device (image sensor) 204 and subjected to a signal process.

The signal processing section 105 calculates a high precision pixel value corresponding to each band (wavelength) by iterative calculation using the equations (Equations 23) of each calculating the pixel value corresponding to the band for calculating a true pixel value which corresponds to each band and from which the noise component is removed, with the use of the raw image pixel values (Rraw and the like) of the image pickup device (image sensor) 104.

Furthermore, the signal processing section 105 or a processing section in rear of the signal processing section 105 executes a process of generating a high precision color image with a smaller noise component using the high precision pixel value corresponding to each band, a process of analyzing color components of the subject, and the like.

It is noted that the signal processing section 105 may be configured to execute a data process by a program (software) or may be configured to use hardware such as FPGA.

It is noted that the image processing apparatus according to the embodiment of the present disclosure may be configured not only per camera end as depicted in FIG. 24 but also using a system depicted in, for example, FIGS. 25A and 25B.

FIG. 25A is a configuration such that captured images (raw images) of a multispectral camera 200 are input to an image processing apparatus 250 such as a PC and the image processing apparatus 250 executes a data process.

The image processing apparatus 250 such as the PC calculates a high precision pixel value corresponding to each band (wavelength) by iterative calculation using the equations (Equations 23) of each calculating the pixel value corresponding to the band for calculating a true pixel value which corresponds to each band and from which the noise component is removed, with the use of the raw image pixel values (Rraw and the like) input from the multispectral camera 200.

Furthermore, as depicted in FIG. 25B, the image processing system is configured such that a photographic image (raw image) from the multispectral camera 200 is input to an image process execution server 270 via a network and the image process execution server 270 executes a data process.

The image process execution server 270 calculates a high precision pixel value corresponding to each band (wavelength) by iterative calculation using the equations (Equations 23) of each calculating the pixel value corresponding to the band for calculating a true pixel value which corresponds to each band and from which the noise component is removed, with the use of the raw image pixel values (Rraw and the like) input from the multispectral camera 200.

In such way, the image processing apparatus or the system according to the embodiment of the present disclosure can be variously configured.

8. Example of Hardware Configuration of Image Processing Apparatus

An example of a hardware configuration of the image processing apparatus will next be described with reference to FIG. 26. FIG. 26 is a diagram depicting an example of the hardware configuration of the image processing apparatus for executing the processes according to the embodiment of the present disclosure.

A CPU (Central Processing Unit) 501 functions as a control section or a data processing section that executes various processes in accordance with a program stored in a ROM (Read Only Memory) 502 or a storage section 508. The CPU 501 executes processes in accordance with, for example, the sequence described in the above embodiments.

A RAM (Random Access Memory) 503 stores therein the program executed by the CPU 501, data, and the like. The CPU 501, the ROM 502, and the RAM 503 are mutually connected by a bus 504.

The CPU 501 is connected to an input/output interface 505 via the bus 504, and an input section 506 configured with various switches with which the photographic image of an image pickup section 521 is input and a user can input data or the like, a keyboard, a mouse, a microphone, and the like, and an output section 507 executing output of data to a display section 522, a speaker, and the like are connected to the input/output interface 505. The CPU 501 executes various processes in response to a command input from the input section 506, and outputs a process result to, for example, the output section 507.

The storage section 508 connected to the input/output interface 505 is configured from, for example, a hard disk, and stores therein the program executed by the CPU 501 and various kinds of data. The communication section 509 functions as a transmitting and receiving section for Wi-Fi communication, Bluetooth (registered trademark) (BT) communication, and data communication via a network such as the Internet or the Local Area Network, and communicates with external apparatuses.

A drive 510 connected to the input/output interface 505 drives a removable medium 511 such as a magnetic disk, an optical disk, a magneto-optical disk, or a semiconductor memory such as a memory card, and executes recording or reading of data.

9. General Overview of Configuration of Present Disclosure

The embodiments of the present disclosure have been described so far in detail with reference to the specific embodiments. Nevertheless, it is obvious that a person having ordinary skill in the art can make revision of the embodiments or find replacements therefor within the scope of the present disclosure. In other words, the present disclosure has been disclosed in an illustrative form and should not be interpreted exclusively. Reference should be made to claims for the assessment of the scope of the present disclosure.

Note that the technology disclosed in the present specification can be configured as follows.

(1) An image pickup apparatus including:
a multi-band pass filter that selectively transmits band light in a specific band;
a color filter that transmits the band light in the specific band per pixel of an image pickup device;
the image pickup device that receives light transmitted by the multi-band pass filter and the color filter; and
a signal processing section to which a pixel value of the image pickup device is input and which executes a signal process on the pixel value, in which
the multi-band pass filter is configured to selectively transmit band light corresponding to a plurality of color filter elements that configure the color filter, and
the signal processing section
generates a pixel value corresponding to a band, of a pixel to be processed, using a raw image base pixel value signal per pixel based on the pixel value of the image pickup device and a spectral characteristic parameter of the image pickup apparatus.

(2) The image pickup apparatus according to (1), in which
the signal processing section
  executes iterative calculation of an equation of calculating a pixel value corresponding to a band using the raw image base pixel value signal and the spectral characteristic parameter, and calculates a convergence value by the iterative calculation as the pixel value corresponding to the band.

(3) The image pickup apparatus according to (1) or (2), in which
  the spectral characteristic parameter includes
  an intensity ratio of a plurality of different color filter elements that configures the color filter of the multispectral camera in the specific band of the transmitted light.

(4) The image pickup apparatus according to (3), in which
  the specific band includes
  a transmitted light band of the multi-band pass filter.

(5) The image pickup apparatus according to any one of (1) to (4), in which
the signal processing section
  generates the raw image base pixel value signal per pixel by performing a demosaicing process on a raw image input from the image pickup device, and calculates the pixel value corresponding to the band per pixel.

(6) The image pickup apparatus according to any one of (1) to (5), in which
the signal processing section
  generates the raw image base pixel value signal in units of a plurality of pixel blocks of a raw image input from the image pickup device, and calculates the pixel value corresponding to the band in units of the pixel block.

(7) The image pickup apparatus according to any one of (1) to (6), in which
  the color filter includes an RGB color filter,
  the multi-band pass filter is configured to selectively transmit each band light of light in RGB bands, and
  the signal processing section
    executes iterative calculation of the equation of calculating the pixel value corresponding to the band, and calculates a convergence value by the iterative calculation as each of RGB pixel values of the pixel to be processed.

(8) The image pickup apparatus according to (7), in which
the signal processing section
  further generates a noise-reduced high precision color image using the RGB pixel values calculated.

(9) The image pickup apparatus according to any one of (1) to (8), in which
  the color filter includes an RGBIR color filter,
  the multi-band pass filter is configured to selectively transmit each band light of light in RGBIR bands, and
  the signal processing section
    executes iterative calculation of the equation of calculating the pixel value corresponding to the band, and calculates a convergence value by the iterative calculation as each of RGBIR pixel values of the pixel to be processed.

(10) The image pickup apparatus according to (9), in which
the signal processing section
  further calculates an activity index value of vegetation that is a photographic subject using the RGBIR pixel values calculated.

(11) An image processing apparatus including:
  a signal processing section to which a pixel value of an image pickup device of a multispectral camera is input and which executes a signal process on the pixel value, in which
  the signal processing section
    generates a pixel value corresponding to a band, of a pixel to be processed, using a raw image base pixel value signal per pixel based on the pixel value of the image pickup device and a spectral characteristic parameter of the image pickup apparatus.

(12) The image processing apparatus according to (11), in which
the signal processing section
  executes iterative calculation of an equation of calculating a pixel value corresponding to a band using the raw image base pixel value signal and the spectral characteristic parameter, and calculates a convergence value by the iterative calculation as the pixel value corresponding to the band.

(13) The image processing apparatus according to (11) or (12), in which
  the spectral characteristic parameter includes
  an intensity ratio of a plurality of different color filter elements that configures the color filter of the multispectral camera, in the specific band of the transmitted light.

(14) The image processing apparatus according to (13), in which
  the specific band includes
  a transmitted light band of a multi-band pass filter of the multispectral camera.

(15) The image processing apparatus according to any one of (11) to (14), in which
the signal processing section
  executes iterative calculation of the equation of calculating the pixel value corresponding to the band, calculates each of RGB pixel values of the pixel to be processed, by the iterative calculation, and generates a noise-reduced high precision color image.

(16) The image processing apparatus according to any one of (11) to (15), in which
the signal processing section
  executes iterative calculation of the equation of calculating the pixel value corresponding to the band, calculates each of RGBIR pixel values of the pixel to be processed, by the iterative calculation, and calculates an activity index value of vegetation that is a photographic subject of the multispectral camera using the RGBIR pixel values calculated.

(17) An image processing method executed by an image pickup apparatus, in which
  the image pickup apparatus includes:
  a multi-band pass filter that selectively transmits band light in a specific band;
  a color filter that transmits the band light in the specific band per pixel of an image pickup device;
  the image pickup device that receives light transmitted by the multi-band pass filter and the color filter; and
  a signal processing section to which a pixel value of the image pickup device is input and which executes a signal process on the pixel value,
  the multi-band pass filter is configured to selectively transmit band light corresponding to a plurality of color filter elements that configures the color filter, and
  the signal processing section
    generates a pixel value corresponding to a band, of a pixel to be processed, using a raw image base pixel value signal per pixel based on the pixel value of the image pickup device and a spectral characteristic parameter of the image pickup apparatus.

(18) An image processing method executed by an image processing apparatus, in which the image processing apparatus includes a signal processing section to which a pixel value of an image pickup device of a multispectral camera is input and which executes a signal process on the pixel value, and the signal processing section generates a pixel value corresponding to a band, of a pixel to be processed, using a raw image base pixel value signal per pixel based on the pixel value of the image pickup device and a spectral characteristic parameter of the image pickup apparatus.

(19) A program for causing an image process to be executed in an image processing apparatus, in which the image processing apparatus includes a signal processing section to which a pixel value of an image pickup device of a multispectral camera is input and which executes a signal process on the pixel value, and the program causes the signal processing section to generate a pixel value corresponding to a band, of a pixel to be processed, using a raw image base pixel value signal per pixel based on the pixel value of the image pickup device and a spectral characteristic parameter of the image pickup apparatus.

Furthermore, a series of processes described in the specification can be executed by hardware, software, or a composite configuration of both the hardware and the software. In a case in which the processes are executed by software, then a program recording a process sequence can be executed by installing the program in a memory within a computer incorporated into dedicated hardware, or can be executed by installing the program in a general-purpose computer capable of executing various processes. For example, the program can be recorded in a storage medium in advance. The program can be executed not only by installing the program from the storage medium in the computer but also by receiving the program via a network such as a LAN (Local Area Network) or the Internet and installing the received program in a recording medium such as a hard disk incorporated in the computer.

Note that the various processes described in the specification may be executed not only in time series in accordance with the description but also individually or in parallel in response to a processing capability of an apparatus that executes the processes or as needed. Moreover, a system in the present specification means a logical assembly configuration of a plurality of apparatuses and is not limited to a system in which apparatuses with configurations are provided in the same casing.

INDUSTRIAL APPLICABILITY

As described so far, according to the configuration of one embodiment of the present disclosure, the apparatuses and the method capable of calculating a true pixel value in a noise-component-reduced specific band are realized.

Specifically, the configuration has, for example, a multi-band pass filter that selectively transmits band light in a specific band, a color filter, an image pickup device that receives light transmitted by each filter, and a signal processing section. The multi-band pass filter is configured to selectively transmit band light corresponding to color filter elements in the color filter, the signal processing section executes iterative calculation of an equation of calculating a pixel value corresponding to a band, using a raw image base pixel value signal per pixel generated on the basis of a pixel value of an image pickup device and a spectral characteristic parameter of an image pickup apparatus, and calculates a convergence value obtained by the iterative calculation as the pixel value corresponding to the band, of a pixel to be processed.

With these configurations, the apparatuses and the method capable of calculating a true pixel value in the noise-component-reduced specific band are realized.

REFERENCE SIGNS LIST

10 Multispectral camera
11 Lens
12 Dual-band pass filter
13 Color filter
14 Image pickup device (image sensor)
100 Multispectral camera
101 Lens
102 Multi-band pass filter
103 Color filter
104 Image pickup device (image sensor)
105 Signal processing section
120 Multispectral camera
121 Lens
122 Multi-band pass filter
123 Color filter
124 Image pickup device (image sensor)
125 Signal processing section
140 Multispectral camera
141 Lens
142 Multi-band pass filter
143 Color filter
144 Image pickup device (image sensor)
145 Signal processing section
170 Multispectral camera
171 Lens
172 Multi-band pass filter
173 Micro lens array
174 Image pickup device (image sensor)
175 Signal processing section
180 Multispectral camera
181 Lens
182 Multi-band pass filter
183 Plasmonic filter
184 Image pickup device (image sensor)
185 Signal processing section
200 Image pickup apparatus (multispectral camera)
201 Lens
202 Multi-band pass filter
203 Color filter
204 Image pickup device (image sensor)
205 Signal processing section
250 Image processing apparatus
270 Image processing execution server
501 CPU
502 ROM
503 RAM
504 Bus
505 Input/output interface
506 Input section
507 Output section
508 Storage section
509 Communication section 510 Drive
511 Removable medium
521 Imaging section
522 Display section

The invention claimed is:

1. An image pickup apparatus, comprising:
an image pickup device that includes a plurality of pixels;
a color filter that includes a plurality of color filter elements;
a multi-band pass filter configured to selectively transmit band light in a specific band, wherein
the band light corresponds to the plurality of color filter elements,
the color filter is configured to transmit the band light in the specific band to each of the plurality of pixels of the image pickup device, and
the image pickup device is configured to:
receive the band light transmitted by the multi-band pass filter and the color filter; and
generate a raw image based on the received band light; and
a signal processing section configured to:
receive the raw image from the image pickup device;
generate a plurality of raw image base pixel values based on the raw image received from the image pickup device; and
generate a true pixel value, corresponding to the specific band, of each of the plurality of pixels based on the generated plurality of raw image base pixel values and a spectral characteristic parameter of the image pickup apparatus, wherein
the spectral characteristic parameter of the image pickup apparatus represents an intensity ratio of a signal transmitted by a first color filter element of the plurality of color filter elements to a signal transmitted by a second color filter element of the plurality of color filter elements in the specific band of the multi-band pass filter.

2. The image pickup apparatus according to claim 1, wherein the signal processing section is further configured to:
execute iterative calculation of an equation of calculating the true pixel value corresponding to the specific band using the plurality of raw image base pixel values and the spectral characteristic parameter, and
calculate a convergence value by the iterative calculation as the true pixel value corresponding to the specific band.

3. The image pickup apparatus according to claim 1, wherein the specific band includes a transmitted light band of the multi-band pass filter.

4. The image pickup apparatus according to claim 1, wherein the signal processing section is further configured to generate the plurality of raw image base pixel values by a demosaicing process on the raw image received from the image pickup device.

5. The image pickup apparatus according to claim 1, wherein the signal processing section is further configured to:
generate the plurality of raw image base pixel values in units of a plurality of pixel blocks of the raw image received from the image pickup device, and
calculate the true pixel value corresponding to the specific band in units of the plurality of pixel blocks.

6. The image pickup apparatus according to claim 1, wherein
the color filter includes an RGB color filter,
the multi-band pass filter is further configured to selectively transmit the band light of light in RGB bands, and
the signal processing section is further configured to:
execute iterative calculation of an equation of calculating the true pixel value corresponding to the specific band, and
calculate a convergence value by the iterative calculation as each of RGB pixel values of each of the plurality of pixels.

7. The image pickup apparatus according to claim 6, wherein the signal processing section is further configured to generate a noise-reduced high precision color image based on the RGB pixel values.

8. The image pickup apparatus according to claim 1, wherein
the color filter includes an RGBIR color filter,
the multi-band pass filter is further configured to selectively transmit each band light of light in RGBIR bands, and
the signal processing section is further configured to:
execute iterative calculation of an equation of calculating the true pixel value corresponding to the specific band, and
calculate a convergence value by the iterative calculation as each of RGBIR pixel values of each of the plurality of pixels.

9. The image pickup apparatus according to claim 8, wherein the signal processing section is further configured to calculate, based on the RGBIR pixel values, an activity index value of vegetation that is a photographic subject.

10. An image processing apparatus, comprising:
a signal processing section configured to:
receive a raw image from an image pickup device of a multispectral camera, wherein
the raw image is based on band light in a specific band transmitted by each of a multi-band pass filter and a plurality of color filter elements of the multispectral camera, and
the band light is transmitted by the plurality of color filter elements to each of a plurality of pixels of the image pickup device;
generate a plurality of raw image base pixel values based on the raw image; and
generate a true pixel value, corresponding to the specific band, of each of the plurality of pixels based on the generated plurality of raw image base pixel values and a spectral characteristic parameter of the multispectral camera, wherein
the spectral characteristic parameter of the multispectral camera is an intensity ratio of a signal transmitted by a first color filter element of the plurality of color filter elements to a signal transmitted by a second color filter element of the plurality of color filter elements in the specific band of the multi-band pass filter.

11. The image processing apparatus according to claim 10, wherein the signal processing section is further configured to:
execute iterative calculation of an equation of calculating the true pixel value corresponding to the specific band based on the plurality of raw image base pixel values and the spectral characteristic parameter, and calculate a convergence value by the iterative calculation as the true pixel value corresponding to the specific band.

12. The image processing apparatus according to claim 10, wherein the specific band includes a transmitted light band of the multi-band pass filter of the multispectral camera.

13. The image processing apparatus according to claim 10, wherein the signal processing section is further configured to:
   execute iterative calculation of an equation of calculating the true pixel value corresponding to the specific band,
   calculate each of RGB pixel values of each of the plurality of pixels to be processed by the iterative calculation, and
   generate a noise-reduced high precision color image based on the RGB pixel values.

14. The image processing apparatus according to claim 10, wherein the signal processing section is further configured to:
   execute iterative calculation of an equation of calculating the true pixel value corresponding to the specific band,
   calculate each of RGBIR pixel values of each of the plurality of pixels to be processed by the iterative calculation, and
   calculate, based on the RGBIR pixel values, an activity index value of vegetation that is a photographic subject of the multispectral camera.

15. An image processing method executed by an image pickup apparatus, the image processing method comprising:
   selectively transmitting, by a multi-band pass filter of the image pickup apparatus, band light in a specific band, wherein the band light corresponds to a plurality of color filter elements of a color filter of the image pickup apparatus;
   transmitting, by the color filter, the band light in the specific band to each of a plurality of pixels of an image pickup device of the image pickup apparatus;
   receiving, by the image pickup device, the band light transmitted by the multi-band pass filter and the color filter;
   generating, by the image pickup device, a raw image based on the received band light;
   generating, by a signal processing section of the image pickup apparatus, a plurality of raw image base pixel values based on the raw image from the image pickup device; and
   generating, by the signal processing section, a true pixel value, corresponding to the specific band, of each of the plurality of pixels based on the generated plurality of raw image base pixel values and a spectral characteristic parameter of the image pickup apparatus, wherein
      the spectral characteristic parameter of the image pickup apparatus is an intensity ratio of a signal transmitted by a first color filter element of the plurality of color filter elements to a signal transmitted by a second color filter element of the plurality of color filter elements in the specific band of the multi-band pass filter.

16. An image processing method executed by an image processing apparatus, the image processing method comprising:
   receiving a raw image from an image pickup device of a multispectral camera, wherein
      the raw image is based on band light in a specific band transmitted by each of a multi-band pass filter and a plurality of color filter elements of the multispectral camera, and
      the band light is transmitted by the plurality of color filter elements to each of a plurality of pixels of the image pickup device;
   generating a plurality of raw image base pixel values based on the raw image; and
   generating a true pixel value, corresponding to the specific band, of each of the plurality of pixels based on the generated plurality of raw image base pixel values and a spectral characteristic parameter of the multispectral camera, wherein
      the spectral characteristic parameter of the multispectral camera is an intensity ratio of a signal transmitted by a first color filter element of the plurality of color filter elements to a signal transmitted by a second color filter element of the plurality of color filter elements in the specific band of the multi-band pass filter.

17. A non-transitory computer-readable medium having stored thereon, computer-executable instructions which, when executed by an image processing apparatus, cause the image processing apparatus to execute operations, the operations comprising:
   receiving a raw image from an image pickup device of a multispectral camera, wherein
      the raw image is based on band light in a specific band transmitted by each of a multi-band pass filter and a plurality of color filter elements of the multispectral camera, and
      the band light is transmitted by the plurality of color filter elements to each of a plurality of pixels of the image pickup device;
   generating a plurality of raw image base pixel values based on the raw image; and
   generating a true pixel value, corresponding to the specific band, of each of the plurality of pixels based on the generated plurality of raw image base pixel values and a spectral characteristic parameter of the multispectral camera, wherein
      the spectral characteristic parameter of the multispectral camera is an intensity ratio of a signal transmitted by a first color filter element of the plurality of color filter elements to a signal transmitted by a second color filter element of the plurality of color filter elements in the specific band of the multi-band pass filter.

* * * * *